US012485217B2

(12) United States Patent
Haces

(10) Patent No.: US 12,485,217 B2
(45) Date of Patent: Dec. 2, 2025

(54) CONTACTLESS WOUND TREATMENT BARRIER AND METHOD OF CONTACTLESS WOUND TREATMENT

(71) Applicant: Alberto Haces, Parkland, FL (US)

(72) Inventor: Alberto Haces, Parkland, FL (US)

( * ) Notice: Subject to any disclaimer, the term of this patent is extended or adjusted under 35 U.S.C. 154(b) by 1002 days.

(21) Appl. No.: 17/339,879

(22) Filed: Jun. 4, 2021

(65) Prior Publication Data

US 2022/0088287 A1 Mar. 24, 2022

Related U.S. Application Data

(60) Provisional application No. 63/082,465, filed on Sep. 23, 2020.

(51) Int. Cl.
*A61M 1/00* (2006.01)
*A61L 15/22* (2006.01)
(Continued)

(52) U.S. Cl.
CPC ............... *A61M 1/94* (2021.05); *A61L 15/22* (2013.01); *A61L 15/425* (2013.01); *A61M 35/30* (2019.05);
(Continued)

(58) Field of Classification Search
CPC .............. A61M 35/00; A61L 2300/106; A61L 2300/404; A43B 17/00; A43B 7/00; A43B 1/0045; B32B 2437/02
See application file for complete search history.

(56) References Cited

U.S. PATENT DOCUMENTS 3,235,446 A 2/1966 Shelanski et al.
4,381,380 A 4/1983 LeVeen et al.
(Continued)

FOREIGN PATENT DOCUMENTS

CA 2654213 A1 9/2010
CN 2919942 Y 7/2007
(Continued)

OTHER PUBLICATIONS

EP 21 873 190.9 European Union Search Report Dated Sep. 30, 2024.

(Continued)

*Primary Examiner* — Jessica Arble
(74) *Attorney, Agent, or Firm* — Allen D Hertz, P.A.; Allen D. Hertz

(57) ABSTRACT

A contactless wound treatment barrier assembly carrying a primed wound treatment composition carrier is secured to a patient's skin at a location encapsulating a wound. A wound treatment composition is emitted from the carrier in a gaseous state. The gaseous emission remains within an interior volume of the wound treatment barrier assembly. The design of the wound treatment barrier assembly can minimize any contact between a body of the wound treatment barrier assembly, the wound treatment composition carrier and the wound. An insole carrying a wound treatment composition (such as elemental Iodine) can be used in any of a variety of forms. The insole would deliver the treatment composition. The insole can be designed to provide contactless or contact delivery of the treatment composition.

23 Claims, 17 Drawing Sheets

(51) Int. Cl.
*A61L 15/42* (2006.01)
*A61M 35/00* (2006.01)

(52) U.S. Cl.
CPC ... *A61L 2300/106* (2013.01); *A61L 2300/404* (2013.01)

(56) References Cited

U.S. PATENT DOCUMENTS

| | | | |
|---|---|---|---|
| 5,388,349 | A | 2/1995 | Ogden |
| 5,639,452 | A | 6/1997 | Messier |
| 5,928,665 | A | 7/1999 | Cercone |
| 5,980,827 | A | 11/1999 | Messier |
| 6,045,820 | A | 4/2000 | Messier |
| 6,696,055 | B2 | 2/2004 | Messier |
| 6,899,868 | B2 | 5/2005 | Messier |
| 7,261,701 | B2 | 8/2007 | Davis |
| 7,263,814 | B2 | 9/2007 | Rosati |
| 10,583,229 | B2 | 3/2020 | Middaugh et al. |
| 11,504,268 | B2 | 11/2022 | Scalzo et al. |
| 11,759,368 | B2 | 9/2023 | Donda et al. |
| 2001/0009661 | A1 | 7/2001 | Messier |
| 2003/0037673 | A1 | 2/2003 | Messier |
| 2003/0099606 | A1 | 5/2003 | Messier |
| 2013/0289471 | A1 | 10/2013 | Ward et al. |
| 2019/0297992 | A1* | 10/2019 | Raza ............... A61F 5/0116 |
| 2020/0000630 | A1* | 1/2020 | Scalzo ............... A61F 7/00 |
| 2020/0268919 | A1* | 8/2020 | Radicone ............. A61L 2/20 |
| 2022/0088287 | A1 | 3/2022 | Haces |
| 2022/0305245 | A1* | 9/2022 | Regev ............. A61L 15/44 |

FOREIGN PATENT DOCUMENTS

| | | |
|---|---|---|
| CN | 103005782 A | 4/2013 |
| CN | 210227085 U | 4/2020 |
| DE | 102008041785 A1 | 3/2010 |
| DE | 102008041785 B4 | 7/2011 |
| JP | 3737726 B6 | 1/2006 |
| WO | WO9406296 A1 | 3/1994 |
| WO | 2013008013 A2 | 1/2013 |
| WO | 2020003049 A1 | 2/2020 |

OTHER PUBLICATIONS

Iodine Made Easy; Sibbald RG, et al.; Wounds International vol. 2, Issue 2; Source: http://www.woundsinternational.com; Dated May 2011.

In Flanders Fields: The Great War, Antoine Depage, and the Resurgence of Débridement; Thomas S. Helling, et al.; Annuls of Surgery vol. 228, Issue 2, pp. 173-181; Dated 1998.

Oxygen in Wound Healing and Infection; Finn Gottrup; World Journel of Surgery, vol. 28, Issue 3, 2004:312-315; doi:10.1007/s00268-003-7398-5; Dated Feb. 2004.

Diabetic impairments in NO-mediated endothelial progenitor cell mobilization and homing are reversed by hyperoxia and SDF-1a; Katherine A. Gallagher, et al.; J Clin Invest. 2007 vol. 117, No. 5, pp. 1249-1259; doi:10.1172/JCI29710; https://jci.me/29710/pdf; Dated May 2007.

Acute and impaired wound healing: pathophysiology and current methods for drug delivery, part 1: normal and chronic wounds: biology, causes, and approaches to care; Tatiana N. Demidova-Rice, Michael R. Hamblin, and Ira M. Herman; Published as: Adv Skin Wound Care. Jul. 2012 ; 25(7):304-314. doi:10.1097/01.ASW.0000416006.55218.d0; Dated Jul. 2012.

Formation of the Scab and the Rate of Epithelization of Superficial Wounds in the Skin of the Young Domestic Pig; George D. Winter; Nature Publishing Group; 1962; 193:293-4; Dated Jan. 1962.

The Molecular Biology of Wound Healing; Michael Galko, et al.; PLoS Biology Aug. 2004, vol. 2, Issue 8, e255, e278; doi:10.1371/journal.pbio.0020278; Dated Aug. 2004.

Cellular and genetic analysis of wound healing in *Drosophila larvae*; Michael J. Galko*, Mark A. Krasnow; PLoS Biology vol. 2, Issue 8; www.plosbiology.org; Dated Aug. 2004.

Pressure Ulcers: Current Understanding and Newer Modalities of Rreatment; Surajit Bhattacharya, et al.; Indian Journal of Plastic Surgery, Jan.-Apr. 2015, vol. 48, Issue 1, pp. 4-16; doi:10.4103/0970-0358.155260; www.ijps.org; Dated Jan. 2015.

The Potential of Nitric Oxide Releasing Therapies as Antimicrobial Agents; David O. Schairer, et al.; Virulence vol. 3, Issue 3, pp. 271-279; doi:10.4161/viru.20328; www.landesbioscience.com; Dated 2012.

The Extrathyronine Actions of Iodine as Antioxidant, Apoptotic, and Differentiation Factor in Various Tissues; Carmen Aceves, et al.; Thyroid, vol. 23, No. 8, 2013; https://doi.org/10.1089/thy.2012.0579; Dated 2013.

Antimicrobial Properties of Plant Essential Oils against Human Pathogens and Their Mode of Action: An Updated Review; Mallappa Kumara Swamy, et al.; Evidence-Based Complementary and Alternative Medicine 2016 vol. 2016, Article ID 3012462; doi:10.1175/2016/3012462; www.hindawi.com; Dated Oct. 2016.

Antimicrobial Activity and Biocompatibility of Polyurethane-Iodine Complexes, Jie Luo, Ying Deng and Yuyu Sun; 0883-9115/10/02 0185-22; DOI: 10.1177/0883911509359980 Dated 2010.

Iodoform (triiodomethane)—An Old, but Still Extremely Efficient Antiseptic; Mihai Dimitriu, et al.; www.revistadechimie.ro; Article in Revista de Chimie—Bucharest—Original Edition, 70, No. 4; Dated May 2019.

Separation and Recovery of Iodine from Aqueous Solution by Permeation and Chemical Desorption (PCD) Using a Silicone Rubber Membrane; Jun Sawai, et al.; http://dx.doi.org/10.4236/aces.2012.24062; Dated Oct. 2012.

Hyperoxia, Endothelial Progenitor Cell Mobilization, and Diabetic Wound Healing; Zhao-Jun Liu, et al.; Antioxidants & Redox Signaling; vol. 10, No. 11, 2008; DOI: 10.1089/ars.2008.2121; Dated May 2008.

Role of Nitric Oxide in Wound Repair; Maria B. Witte, et al.; Excerpta Medica, The American Journal of Surgery vol. 183 (200), pp. 406-412; 183-406-4122002; Dated Jan. 2002.

PCT/US2024/048789 International Search Report Dated Apr. 12, 2024.

* cited by examiner

CONTACTLESS WOUND TREATMENT BARRIER AND METHOD OF CONTACTLESS WOUND TREATMENT

CROSS-REFERENCE TO RELATED APPLICATION

This Non-Provisional Utility Patent application claiming the benefit of Provisional Patent Application Ser. No. 63/082,465 filed on Sep. 23, 2020, which is incorporated herein in its entirety.

FIELD OF THE INVENTION

The present invention relates generally to the field of wound treatment and more specifically relates to an apparatus and method of use of applying a wound treatment composition in a gaseous state to a wound using a barrier retaining the wound treatment composition within an interior volume thereof. The wound barrier and wound composition delivery device remain distant and contact free from the wound.

BACKGROUND OF THE PRESENT INVENTION

Chronic skin wounds affect an estimated 6.5 million people in the United States, with treatment costs accounting for up to $25 billion per year. Populations at risk for chronic wounds include the elderly and those with co-morbidities such as diabetes and obesity. If not treated properly, chronic wounds can lead to severe local infection, sepsis, tissue or limb amputation, or death.

Treatment of dermatological wounds has generally been accomplished using a topical application, an oral application, an injected application, or any combination thereof. Topical applications are usually at least one of iodine, iodine releasing compounds (Iodophores), and other antimicrobial compounds.

The topical applications are customarily applied directly to the epidermis, or the outermost layer of skin. The topical applications are applied using an applicator, such as a cotton swab and either left exposed, or more commonly covered using a sterile covering such as a gauze pad, a pad in combination with an adhesive tape, an adhesive bandage, or other suitable covering.

The topical treatment can be applied in a form of a medicated adhesive patch. The medicated adhesive patch is an adhesive pad comprising a pre-applied volume of the topical treatment composition. Medicated adhesive patches can be applied to the patient's skin for surface treatment, such as injuries to the skin or transdermal treatment for delivery of a dosage of medication through the skin into the bloodstream.

Iodine, as tincture, or as iodine releasing compounds (Iodophores), and other antimicrobial compounds have been used topically for many years in the treatment of wounds (Sibbald R G, Leaoer D J, Queen D. Iodine Made Easy. *Wounds International* 2011; 2(2): Source: http://www.woundsinternational.com). These topically applied compositions are mostly applied to prevent wound or skin infections. If topical antimicrobials are used as soon as a wound is created, antibiotics might not be necessary. Most of these germicides are applied using a vehicle, such in water solution, in a hydrogel, or in some solid substrate used as dressing. Among the iodophores, povidone iodine solution (PVP-I) and cadexomer iodine are the most frequently used. However, the PVP-I can be toxic at the amounts used or, can irritate the wound. In a case of a cadexomer iodine (an iodine/polysaccharide gel complex, such as IODO-FLEX® and IODOSORB® used as antiseptic fillers in cavity wounds), this treatment protocol require continuous replacement of the dressings, which is time consuming, requires some professional training, and is not always effective. Traditional wound dressings stick to the wound and surrounding skin, where, at times can aggravate or re-injure the wound and/or the area surrounding the wound during removal of the wound dressing from the skin of the patient.

For many years, the wound care paradigm was to leave the cleaned and disinfected wound exposed to the air (dry healing) for a faster and less infective healing before applying sutures (In Flanders fields: the Great War, Antoine Depage, and the resurgence of débridement. Helling T S, Daon E *Ann Surg.* 1998 August; 228(2):173-81). It is known that oxygen plays a role in many of the stages of healing (Gottrup F. Oxygen in wound healing and infection. *World J Surg.* 2004; 28(3):312-315. doi:10.1007/s00268-003-7398-5, Gallagher K A, Liu Z J, Xiao M, et al.) Diabetic impairments in NO-mediated endothelial progenitor cell mobilization and homing are reversed by hyperoxia and SDF-1 alpha. (*J Clin Invest.* 2007; 117(5):1249-1259. doi: 10.1172/JCI29710), while hypoxia is only needed at the beginning of the healing process (Demidova-Rice T N, Hamblin M R, Herman I M. Acute and impaired wound healing: pathophysiology and current methods for drug delivery, part 1: normal and chronic wounds: biology, causes, and approaches to care. *Adv Skin Wound Care.* 2012; 25(7):304-314. doi:10.1097/01.ASW.0000416006.55218.d0). But since the work of Winter (Formation of the scab and the rate of epithelization of superficial wounds in the skin of the young domestic pig. WINTER G D, *Nature.* 1962; 193:293-4), the wound-care community now believes that moist wounds heal faster and without a scab. To effect their healing properties, moist dressings are periodically applied to the wound several times a day to protect it from infection, but the moist dressings also prevent necessary oxygen from permeating into the wound. Further, the removal of the moist dressings can aggravate or re-injure the wound and/or the area surrounding the wound as well. Moist dressing deter production of a scab and leads to less scar tissue, but require more manipulations than a scab-forming, natural healing process.

While healing more slowly, a non-infected dry scab, being a natural dressing, will protect the underlying tissue from further infection if not disturbed, eliminating the need of dressing re-application while letting nature take its course. Most mothers in their wisdom, tell their children not to pick on their wound scabs; they are right about this (The molecular biology of wound healing: The Molecular Biology of Wound Healing. *PLoS Biol.* 2004; 2(8):e278. doi:10.1371/journal.pbio.0020278, Galko M J, Krasnow M A.)(Cellular and genetic analysis of wound healing in *Drosophila* larvae. *PLoS Biol.* 2004; 2(8):E239. doi:10.1371/journal.pbio.0020239)

The scab formation is greatly accelerated in a dry, oxygen rich environment. In fact, scab formation is an early sign of healing, but not all wounds form scabs and many become ulcers or non-healing wounds. Sometimes an ulcer can form without an abrasive force, just enough pressure in the foot or other body part (Bhattacharya S, Mishra R K. Pressure ulcers: Current understanding and newer modalities of treatment. *Indian J Plast Surg.* 2015; 48(1):4-16. doi:10.4103/0970-0358.155260) can form a pressure ulcer (PU). Therefore, an accelerated scab formation and healing would be a desirable quality in an antimicrobial agent to dry PUs. To date, the only suitable agent with such desirable properties is nitric oxide (NO), a natural bactericidal and healing promoter gas produced by endothelial cells. But delivery of nitric oxide (NO) is difficult due to a resulting toxicity, as the nitric oxide (NO) reacts with oxygen to produce toxic nitrogen dioxide (Schairer D O, Chouake J S, Nosanchuk J D, Friedman A J. The potential of nitric oxide releasing therapies as antimicrobial agents. *Virulence.* 2012; 3(1):271-279. doi:10.4161/viru.20328).

SUMMARY OF THE PRESENT INVENTION

Recently, the Inventor has discovered that elemental iodine gas or vapor dramatically accelerates the drying as well as the scab formation process in wounds. This is an aerobic, novel, mild, controllable, non-contact delivery of antimicrobials or therapeutics. The inventive delivery can be stopped at any time, whereas PV-I, or other topical agents, cannot be removed once applied. The latter also need a dressing to cover the wound. Thus, iodine gas should be considered more efficacious than PV-I with much less toxicity. Additionally, oral elemental iodine, in vitro and on pre-clinical trials, shows anti-proliferative effects in benign and malignant neoplasia such as benign prostate hyperplasia (BPH) and breast and prostate cancers (Aceves, C., Anguiano, B., Delgado, G: The Extrathyronine Actions of Iodine as Antioxidant, Apoptotic, and Differentiation Factor in Various Tissues, *Thyroid*, Volume 23, Number 8, 2013. https://doi.org/10.1089/thy.2012.0579). Furthermore, the present invention can be adapted to deliver NO in a simpler, contactless way as well. Currently, known nitric oxide (NO) delivery methods utilize either a contact wound dressing; a patch that releases the gas from a chemical reaction; or using direct gas from a gas bottle. Additionally, the method of delivery provide by the present invention can be employed to deliver any volatile antimicrobial agents (Swamy M K, Akhtar M S, Sinniah U R. Antimicrobial Properties of Plant Essential Oils against Human Pathogens and Their Mode of Action: An Updated Review. *Evid Based Complement Alternat Med.* 2016; 2016:3012462. doi:10.1175/2016/3012462) to wounds such as: essential oils and/or their active components, oxygen or any other volatile therapeutics.

The invention provides an apparatus and a respective method to overcome the main deficiencies of the current state of the art by providing a novel method of delivering antimicrobials to wounds in a gentler, more effective method. The method of the present invention provides a wound-contactless gas chamber created by a contactless wound treatment delivery body in contact with skin surrounding a wound of a patient. The gas chamber positioned above the wound is filled with at least one of (a) an antimicrobial gas and (b) a healing gas. The gas chamber can be secured in position over the wound using any suitable attachment element, including adhesive, double sided adhesive, an elastic band, a rubber band, a ribbon, a strap, a bandage, and the like.

In a first aspect of the present invention, a contactless wound treatment barrier assembly includes:
  a wound treatment barrier body formed to provide an interior volume defined by an interior surface of the wound treatment barrier body extending from an attachment peripheral edge forming an enclosed space,
  a wound treatment composition carrier assembled to the interior surface of the wound treatment barrier body, and
  a wound treatment composition applied to the wound treatment composition carrier.

In a second aspect, the wound treatment barrier body can be fabricated of a breathable material.

In another aspect, the wound treatment barrier body can be fabricated of a non-breathable material.

In another aspect, the wound treatment barrier body can be shaped to include an interior volume defining a chamber having a size to confine the gas for enough time to produce a desired biological effect during application of the wound treatment composition in a gaseous state.

In yet another aspect, the contactless wound treatment barrier assembly further comprising a contact flange extending radially outward from the attachment peripheral edge of the wound treatment barrier body.

In yet another aspect, the contactless wound treatment barrier assembly further comprising a contact flange extending radially outward from and circumscribing the attachment peripheral edge of the wound treatment barrier body.

In yet another aspect, the wound treatment composition is at least one of an antimicrobial compound, iodine, elemental iodine, and an iodine releasing compound.

In yet another aspect, the wound treatment composition is an antimicrobial compound.

In yet another aspect, the wound treatment composition is iodine.

In yet another aspect, the wound treatment composition is an iodine releasing compound.

In yet another aspect, the wound treatment composition is at least one of:
  elemental iodine,
  iodoform,
  ethanol,
  isopropyl alcohol,
  maltol,
  3-(phenylamino) butan-2-one (schleiferon A),
  3-(phenylimino) butan-2-one (schleiferon B),
  acetoin and 2-phenylethylamine,
  elemental sulfur,
  nonanol,
  decanol,
  undecanol,
  dodecanol,
  NO gas releasing compounds such as S-Nitrosoglutathione,
  1-hydroxy-2-oxo-3,3-bis(2-aminoethyl)1-triazene,
  1-hydroxy-2-oxo-3,3-bis(3-aminoethyl)1-triazene,
  1-hydroxy-2-oxo-3-(3-aminopropyl) 3-(4-aminobutyl) 1-triazene
  Oxygen,
  essential antimicrobial oils from oregano,
  thyme,
  clove,
  lavender,
  clary sage,
  arborvitae,
  active oils eucalyptol,
  thymol,
  menthol,
  carvacrol, thymol,
  cinnamic aldehyde,
  eugenol,
  p-cymene,
  allicine,
  calendula oil,
  melaleuca oil, and
  lemongrass oil.

In yet another aspect, the wound treatment composition carrier impregnated with the wound treatment composition is stored within a moisture impervious container until ready for use.

In yet another aspect, the wound treatment composition is iodine impregnated activated charcoal embedded in the wound treatment composition carrier or inside of a pouch inside the wound treatment composition carrier.

In yet another aspect, the wound treatment composition carrier can be foam or silicone rubber.

In yet another aspect, the wound treatment composition carrier impregnated with the wound treatment composition is placed directly against the interior surface of the wound treatment barrier body and secured to the interior surface of the wound treatment barrier body using any suitable attachment configuration.

In yet another aspect, the wound treatment composition carrier impregnated with the wound treatment composition is placed directly against the interior surface of the wound treatment barrier body and secured to the interior surface of the wound treatment barrier body using a mechanical fastener.

In yet another aspect, the wound treatment composition carrier impregnated with the wound treatment composition is placed directly against the interior surface of the wound treatment barrier body and secured to the interior surface of the wound treatment barrier body using a mechanical fastener, wherein the mechanical fastener is a selected from a group of mechanical fasteners, the group of mechanical fasteners including a staple, a rivet, a snap stud and socket, a hook and loop, a dense hook and loop tape, an adhesive a double sided adhesive, a bonding agent, and the like.

In yet another aspect, the wound treatment composition carrier impregnated with the wound treatment composition is placed directly against the interior surface of the wound treatment barrier body and secured to the interior surface of the wound treatment barrier body using a magnetic attraction, wherein the magnetic attraction is provided by a magnetized element and a magnetically attracted element, such as an element fabricated of or containing a ferrous material. One of the magnetized element or the magnetically attracted element is secured to the wound treatment composition carrier; the other of the magnetized element or the magnetically attracted element is secured to the interior surface of the wound treatment barrier body at a desired location for delivery of the wound treatment composition.

In yet another aspect, the storage and delivery container body is sealed by a removable element.

In yet another aspect, the storage and delivery container body is sealed by a removable cap.

In yet another aspect, the storage and delivery container body is sealed by a removable foil.

In yet another aspect, the storage and delivery container body includes a tubular sidewall and an end wall comprising an attachment surface.

In yet another aspect, the storage and delivery container body includes the tubular sidewall and the end wall comprising an attachment surface, wherein interior surfaces of the tubular sidewall and end wall define an interior volume.

In yet another aspect, the storage and delivery container body includes a cylindrical sidewall and an end wall comprising an attachment surface.

In yet another aspect, the storage and delivery container body includes the cylindrical sidewall and the end wall comprising an attachment surface, wherein interior surfaces of the cylindrical sidewall and end wall define an interior volume.

In yet another aspect, the storage and delivery container body can further comprise a perforated end wall located proximate to an edge sealed by a removable element.

In yet another aspect, the storage and delivery container body comprising the wound treatment composition carrier impregnated with the wound treatment composition is placed against the interior surface of the wound treatment barrier body and secured to the interior surface of the wound treatment barrier body using a mechanical fastener, wherein the mechanical fastener is a selected from a group of mechanical fasteners, the group of mechanical fasteners including a staple, a rivet, a snap stud and socket, a hook and loop, a dense hook and loop tape, an adhesive a double sided adhesive, a bonding agent, and the like.

In yet another aspect, the storage and delivery container body comprising the wound treatment composition carrier impregnated with the wound treatment composition is placed against the interior surface of the wound treatment barrier body and secured to the interior surface of the wound treatment barrier body using a magnetic attraction, wherein the magnetic attraction is provided by a magnetized element and a magnetically attracted element, such as an element fabricated of or containing a ferrous material. One of the magnetized element or the magnetically attracted element is secured to the storage and delivery container body; the other of the magnetized element or the magnetically attracted element is secured to the interior surface of the wound treatment barrier body at a desired location for delivery of the wound treatment composition.

In yet another aspect, an adhesive is applied to a contacting surface of the contact flange.

In yet another aspect, a protective appliqué is applied to the adhesive on the contacting surface of the contact flange.

In yet another aspect, each end of an elastic band is secured to the contact flange of the contactless wound treatment barrier assembly.

In yet another aspect, a pair of elastic bands is secured to the contact flange of the contactless wound treatment barrier assembly, wherein each end of each elastic band of the pair of elastic bands is secured to the contact flange of the contactless wound treatment barrier assembly.

In yet another aspect, at least two elastic bands are secured to the contact flange of the contactless wound treatment barrier assembly, wherein each end of each elastic band of the at least two elastic bands is secured to the contact flange of the contactless wound treatment barrier assembly.

In yet another aspect, each end of a ribbon or other tie is secured to the contact flange of the contactless wound treatment barrier assembly.

In yet another aspect, a pair of ribbons or other ties is secured to the contact flange of the contactless wound treatment barrier assembly, wherein each end of each ribbon or other tie of the pair of ribbons or other ties is secured to the contact flange of the contactless wound treatment barrier assembly.

In yet another aspect, at least two ribbons or other ties are secured to the contact flange of the contactless wound treatment barrier assembly, wherein each end of each ribbon or other tie of the at least two ribbons or other ties is secured to the contact flange of the contactless wound treatment barrier assembly.

In yet another aspect, a method that treats a wound that is considered to be one of in a process of healing or non-healing in a way that their pathway to successful healing is initiated earlier in the wound healing process (i.e. formation of a scab) with minimal complications.

In yet another aspect, a therapeutically amount of constant anti-infective and healing agent is delivered to a wound providing minimal toxicity or exclusive of any toxicity.

In yet another aspect, a therapeutically amount of constant anti-infective and healing agent is delivered to a wound exclusive of any need for invasive/contact dressings.

In yet another aspect, the wound treatment compositions utilized to treat the wound are antimicrobial agents that can be delivered to the wound in the gaseous form by virtue of their natural gas state.

In yet another aspect, the wound treatment composition utilized to treat the wound is a wound treatment composition that can be delivered to the wound in the gaseous form, wherein the gaseous form of the wound treatment composition is generated from a wound treatment composition, the wound treatment composition being provided in one of a solid state or a liquid state by one of (a) easy sublimation or (b) the high volatility of the wound treatment composition at room temperature.

In yet another aspect, the wound treatment compositions utilized to treat the wound are antimicrobial agents that can be delivered to the wound in the gaseous form, wherein the gaseous form of the antimicrobial agents is generated from the antimicrobial agent, the antimicrobial agent being provided in one of a solid state or a liquid state by one of (a) easy sublimation or (b) the high volatility of the antimicrobial agent at room temperature.

In yet another aspect, the wound treatment compositions utilized to treat the wound are antimicrobial agents that can be delivered to the wound in the gaseous form by virtue of their natural gas state, or generated from a solid or liquid compound by easy sublimation or due to their high volatility at room temperature.

In yet another aspect, an apparatus enabling delivery of a therapeutic agent in a gaseous state to the wound without physical contact between the apparatus and the wound.

In yet another aspect, a method to deliver a therapeutic agent in the gaseous state to the wound without physical contact between the apparatus and the wound.

In yet another aspect, the apparatus includes a non-breathable, hermetic body structure to deliver oxygen sensitive antimicrobial and healing promoting gases to the wound.

In yet another aspect, the wound treatment composition carrier can be fabricated of one of a silicone rubber (with active component dissolved or "baked" in it), a porous foam, or any other substrate having properties that absorbs a liquid quickly and releases the absorbed liquid in a gaseous state at slower rate.

In yet another aspect, the apparatus include a void volume between an interior surface and a wound surface to allow the gas to fill that void and to avoid any contact of the device with the wound.

In yet another aspect, the wound treatment barrier body is fabricated of a partially breathable or non-breathable material that keeps the interior volume humid (and the wound moist to prevent from drying too quickly) by preventing any sweat or water evaporation from the skin to leave the interior volume (wound atmosphere) while saturating the healing atmosphere with the at least one of the gaseous antimicrobial and the healing agent.

In yet another aspect, the wound treatment barrier body creates a rigid chamber, wherein the rigidity of the chamber allows the patient to wear clothing and walk without a risk of the chamber collapsing onto the wound.

In yet another aspect, the chamber or vault where the delivery of the wound treatment composition or active compound is made by a pump or any other delivery device to the inner chamber.

In yet another aspect, the wound treatment barrier body provides a shallow chamber or vault with a minimum void space to deliver oxygen sensitive gases to minimize the amount of oxygen present in the inter-vault/wound void space.

In yet another aspect, the wound treatment composition can be coated upon the interior surface of the wound treatment composition storage and delivery container and covered with a seal until just before use.

In an alternative configuration, the wound treatment barrier body is formed within an insole designed for insertion within a shoe.

In one aspect, the insole is fabricated of a liquid absorbing material.

In a second aspect, the insole is fabricated of a liquid absorbing, or a gas absorbing, material, the liquid absorbing material being one of: a porous material, such as an open cell foam, a polyurethane, a reticulated polyurethane foam, a sponge; an absorbent material such as silicone rubber. The absorbing/releasing material can be infused with the liquid or a solid before the solidifying process during manufacturing said absorbing material.

In another aspect, the insole is fabricated of at least two insole bodies laminated to one another.

In another aspect, the insole comprises at least one receptacle for receiving and retaining a wound treatment composition carrier.

In another aspect, the insole comprises a plurality of receptacles for receiving and retaining a wound treatment composition carrier.

In another aspect, the insole comprises a plurality of receptacles for receiving and retaining a wound treatment composition carrier, wherein at least two receptacles are of a like shape and size.

In another aspect, a first insole body comprises a plurality of receptacles for receiving and retaining a wound treatment composition carrier, wherein at least two receptacles are of a like shape and size, while a second insole body comprises a plurality of apertures, each aperture located in registration with a respective receptacle.

In another aspect, the first insole body and the second insole body are fabricated of like materials.

In another aspect, the first insole body and the second insole body are fabricated of different materials.

In another aspect, a base or bottom insole body further comprising a peripheral edge dam.

In another aspect, the insole body is fabricated of a pliant material.

In another aspect, the insole body is fabricated of an absorbent material.

In another aspect, at least a portion of the insole body is fabricated of a microporous polyurethane foam.

In another aspect, a top surface of the insole body can be of a nylon material, a velvet material, a velour material, a polyester, Rayon, a satin material, or any other suitable material.

In another aspect, the insole body is fabricated of an absorbent material, the wound treatment composition being applied directly to the insole body.

In another aspect, the insole body further comprises a moisture impervious layer of material applied to at least one side of the insole body.

The present invention also describes a method of treating a wound, wherein the method of treatment comprising steps of:
- securing a contactless wound treatment barrier assembly to a patient's skin, wherein the contactless wound treatment barrier assembly is located covering a wound to the patient's skin,
- the contactless wound treatment barrier assembly comprising:
  - a wound treatment barrier body formed to provide an interior volume defined by an interior surface of the wound treatment barrier body extending from an attachment peripheral edge forming an enclosed space,
  - a wound treatment composition carrier assembled to the interior surface of the wound treatment barrier body,
  - a wound treatment composition applied to the wound treatment composition carrier;
- emitting the wound treatment composition in a gaseous state from the wound treatment composition carrier within the interior volume to treat the wound to the patient's skin.

In a second aspect, wherein the step of securing a contactless wound treatment barrier assembly to a patient's skin is accomplished using an adhesive.

In another aspect, wherein the step of securing a contactless wound treatment barrier assembly to a patient's skin is accomplished using an elastic band.

In yet another aspect, wherein the step of securing a contactless wound treatment barrier assembly to a patient's skin is accomplished using at least one elastic band.

In yet another aspect, wherein the step of securing a contactless wound treatment barrier assembly to a patient's skin is accomplished using a plurality of elastic bands.

In yet another aspect, wherein the step of securing a contactless wound treatment barrier assembly to a patient's skin is accomplished using a ribbon or tie.

In yet another aspect, wherein the step of securing a contactless wound treatment barrier assembly to a patient's skin is accomplished using at least one ribbon or tie.

In yet another aspect, wherein the step of securing a contactless wound treatment barrier assembly to a patient's skin is accomplished using a plurality of ribbons or ties.

In yet another aspect, wherein the step of securing a contactless wound treatment barrier assembly to a patient's skin is accomplished by inserting a treatment insole into an interior of a shoe.

In yet another aspect, the wound treatment applicator is fabricated of a material that absorbs the wound treatment composition and releases the wound treatment composition in a gaseous state.

In yet another aspect, the wound treatment applicator is fabricated of microporous polyurethane foam, wherein the microporous polyurethane foam absorbs the wound treatment composition and releases the wound treatment composition in a gaseous state.

In yet another aspect, the insole is fabricated of a plurality of layers laminated to one another in a stacked orientation.

In yet another aspect, the insole is fabricated of a plurality of layers laminated to one another in a stacked orientation, where a top layer is exclusive of any wound treatment composition.

In yet another aspect, the insole is fabricated of a plurality of layers laminated to one another in a stacked orientation, where the top layer is exclusive of any wound treatment composition and at least one lower layer is impregnated with the wound treatment composition.

In yet another aspect, the method can further comprise a step of wearing a sock on a foot being treated by an antimicrobial agent coated insole wherein the process relies on the patient's sock as a separating barrier. The antimicrobial agent can be applied to one or both sides of the coated insole.

In yet another aspect, the method can further comprise a step of a light positioning of the insole in close proximity of the foot wound using at least one of a loosely wrapped bandage and a gauze.

In yet another aspect, the process would exclude any use of petroleum jelly on the gauze.

In yet another aspect, the method can apply the wound treatment composition to an insole inserted into a weight offloading boot.

In yet another aspect, the method can apply the wound treatment composition to an insole wherein the insole would be utilized in conjunction with an Unna boot.

In yet another aspect, the gauze compression would be applied away from the foot ulcer. Once the ulcer dries, the boot can be removed and a sock can be used to separate the insole from the dry ulcer.

The present invention also describes a method of fabricating a wound treatment carrier, the method comprising steps of:
- incorporating elemental Iodine into polyurethane;
- dissolving the polyurethane and elemental Iodine combination into polyols forming a liquid composition;
- treating the liquid composition with Di-isocyanates creating a treated composition; and
- forming the treated composition into an insole.

The present invention also describes a method of fabricating a wound treatment carrier, the method comprising steps of:
- forming a base layer;
- applying a wound treatment composition to the base layer.
- assembling a top layer to the base layer creating the insole.

The present invention also describes a method of fabricating a wound treatment carrier, the method comprising steps of:
- forming a base layer;
- forming a central layer;
- forming a top layer;
- applying a wound treatment composition to at least one of the base layer and the central layer.
- assembling the central layer between the top layer and the base layer creating the insole.

The present invention also describes a method of fabricating a wound treatment carrier, the method comprising steps of:
- forming a base layer;
- forming at least one central layer;
- forming a top layer;
- applying a wound treatment composition to at least one of the base layer and one or more of the at least one central layer.
- assembling each of the at least one central layer between the top layer and the base layer creating the insole.

The present invention also describes a method of fabricating a wound treatment carrier, the method comprising steps of:
- forming a base layer;
- forming at least one central layer;
- forming a top layer;

applying a wound treatment composition to at least one of the base layer and each of the at least one central layer.

assembling each of the at least one central layer between the top layer and the base layer creating the insole.

The present invention also describes a method of fabricating a wound treatment carrier, the method comprising steps of:

forming a base layer of an insole;

applying a microporous polyurethane foam impregnated with a wound treatment composition to a top surface of the base layer.

In yet another aspect, the base layer of the insole is formed to contour to a bottom surface of a patient's foot.

In yet another aspect, the base layer of the insole is formed to have a contour similar to a contour of the bottom surface of the patient's foot.

In yet another aspect, the base layer of the insole is formed to have a contour generally resembling the contour of the bottom surface of the patient's foot.

In yet another aspect, a wound treatment composition can be applied to a carrier material by soaking the carrier material in a volume of wound treatment material.

In yet another aspect, a wound treatment composition can be applied to a carrier material by soaking the carrier material in a volume of wound treatment material, then letting the carrier material dry.

In yet another aspect, a wound treatment composition can be applied to a carrier material using an applicator.

In yet another aspect, a wound treatment composition can be applied to the carrier material using a spray applicator.

In yet another aspect, a wound treatment composition can be applied to the carrier material using the spray applicator, where the spray applicator includes a container and a spray dispenser.

In yet another aspect, a wound treatment composition can be applied to the carrier material using the spray applicator, where the spray applicator includes a container and a pump spray dispenser.

In yet another aspect, a wound treatment composition can be applied to the carrier material using the spray applicator, where the spray applicator includes a container and a childproof dispenser.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION OF THE PRESENT INVENTION

Figure 1:
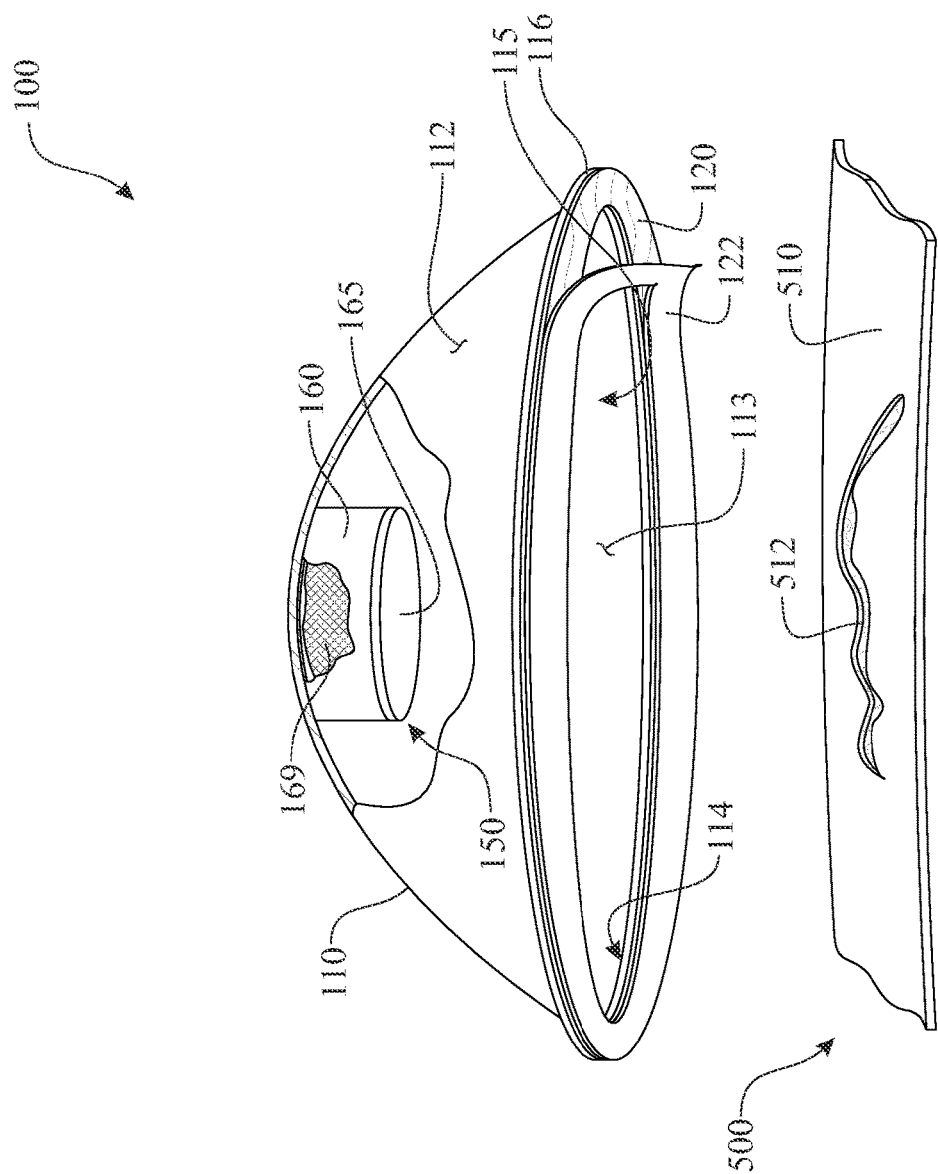
FIG. 1 presents a partially cut-away isometric bottom, front view of an exemplary contactless wound treatment barrier assembly in accordance with the present invention, the exemplary contactless wound treatment barrier assembly shown being placed over an exemplary wound.

Detailed embodiments of the present invention are disclosed herein. It will be understood that the disclosed embodiments are merely exemplary of the invention that may be embodied in various and alternative forms. The figures are not necessarily to scale, and some features may be exaggerated or minimized to show details of particular embodiments, features, or elements. Specific structural and functional details, dimensions, or shapes disclosed herein are not limiting but serve as a basis for the claims and for teaching a person of ordinary skill in the art the described and claimed features of embodiments of the present invention. The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The present invention applies the benefits of antimicrobial and healing properties found in certain proven agents used on wound care treatment, but whose wound contact delivery becomes contraindicated due to toxicity or the inability to keep the wound from getting irritated, and therefore slowing or regressing the healing process. The present invention overcomes these problems by providing an apparatus enabling delivery of the active agents to the wound in a gaseous state, in a contactless fashion, while maintaining a constant delivery of the agent in gaseous form, and keeping the atmosphere around/above the wound in a humidity controlled and oxygen controlled environment. The wound treatment application apparatus can be designed to allow air/oxygen in contact with the wound (aerobic and breathable during the proliferative stage of healing), or designed to prevent air from getting in contact with the wound (hypoxic conditions during the inflammatory stage of healing).

The wound treatment application apparatus can be provided in a variety of form factors. The general concept of the present invention is presented in a first exemplary form factor, referred to as a contactless wound treatment barrier assembly 100 and illustrated in FIGS. 1 through 3. The contactless wound treatment barrier assembly 100 comprises a wound treatment barrier body 110 having a wound treatment barrier body exterior surface 112 and a wound treatment barrier body interior surface 113. The wound treatment barrier body 110 terminates at a wound treatment barrier body peripheral contact edge 114. A wound treatment barrier body support flange 116 is formed extending radially outward from a wound treatment barrier body peripheral contact edge 114 of the wound treatment barrier body 110. The wound treatment barrier body 110 is shaped to create a wound treatment barrier body interior volume 115 on one side of the wound treatment barrier body peripheral contact edge 114. The wound treatment barrier body 110 is of a size and shape where a top or upper area of the wound treatment barrier body interior surface 113 is distant from the wound treatment barrier body peripheral contact edge 114 or the wound treatment barrier body support flange 116. A primed wound treatment composition storage and delivery container assembly 150 is secured to the upper area of the wound treatment barrier body interior surface 113. The primed wound treatment composition storage and delivery container assembly 150 is of a height that is less than a distance between the top or upper area of the wound treatment barrier body interior surface 113 and the wound treatment barrier body support flange 116, ensuring that a lower surface of the primed wound treatment composition storage and delivery container assembly 150 remains elevated above a contacting surface or exemplary skin 510 of an exemplary injured region 500.

The exemplary wound treatment barrier body 110 is illustrated in accordance with a preferred shape, where the wound treatment barrier body peripheral contact edge 114 is circular in shape and the wound treatment barrier body 110 is formed having a domed shape. It is understood that the wound treatment barrier body 110 can be formed having any suitable shape to create a wound treatment barrier body interior volume 115. Examples include a hemispherical shape, a hemi-ellipsoid shape, a hemi-spheroid shape, a hemi-oblate spheroid shape, a hemi-prolate spheroid shape, a cone shape, a frustum shape, a tetrahedron shape, a triangular pyramid shape, a rectangular pyramid shape, a square pyramid shape, a hexagonal pyramid shape, a cube shape, a hexagonal prism shape, and the like.

The primed wound treatment composition storage and delivery container assembly 150 can be provided in any suitable format. The illustration presents a first exemplary configuration of a suitable primed wound treatment composition storage and delivery container assembly 150. The exemplary primed wound treatment composition storage and delivery container assembly 150 includes a primed wound treatment composition storage and delivery container closure 165 sealing a primed wound treatment composition carrier 169 within an interior of a primed wound treatment composition storage and delivery container body 160. A peripheral edge of the primed wound treatment composition storage and delivery container body attachment surface 164 is contiguous about a like shaped and sized peripheral edge of the primed wound treatment composition storage and delivery container body 160. The primed wound treatment composition storage and delivery container body 160 is shaped to form a cavity for retaining the primed wound treatment composition carrier 169. The primed wound treatment composition storage and delivery container body 160 includes a primed wound treatment composition storage and delivery container body exterior surface 162 and a primed wound treatment composition storage and delivery container body interior surface 163. The primed wound treatment composition storage and delivery container body interior surface 163 of the primed wound treatment composition storage and delivery container body 160 provides a peripheral wall defining the cavity. The primed wound treatment composition storage and delivery container body attachment surface 164 provides an interior bottom wall for the cavity. The primed wound treatment composition carrier 169 comprises a volume of wound treatment composition 167 applied to a wound treatment composition carrier 168.

Figure 10:
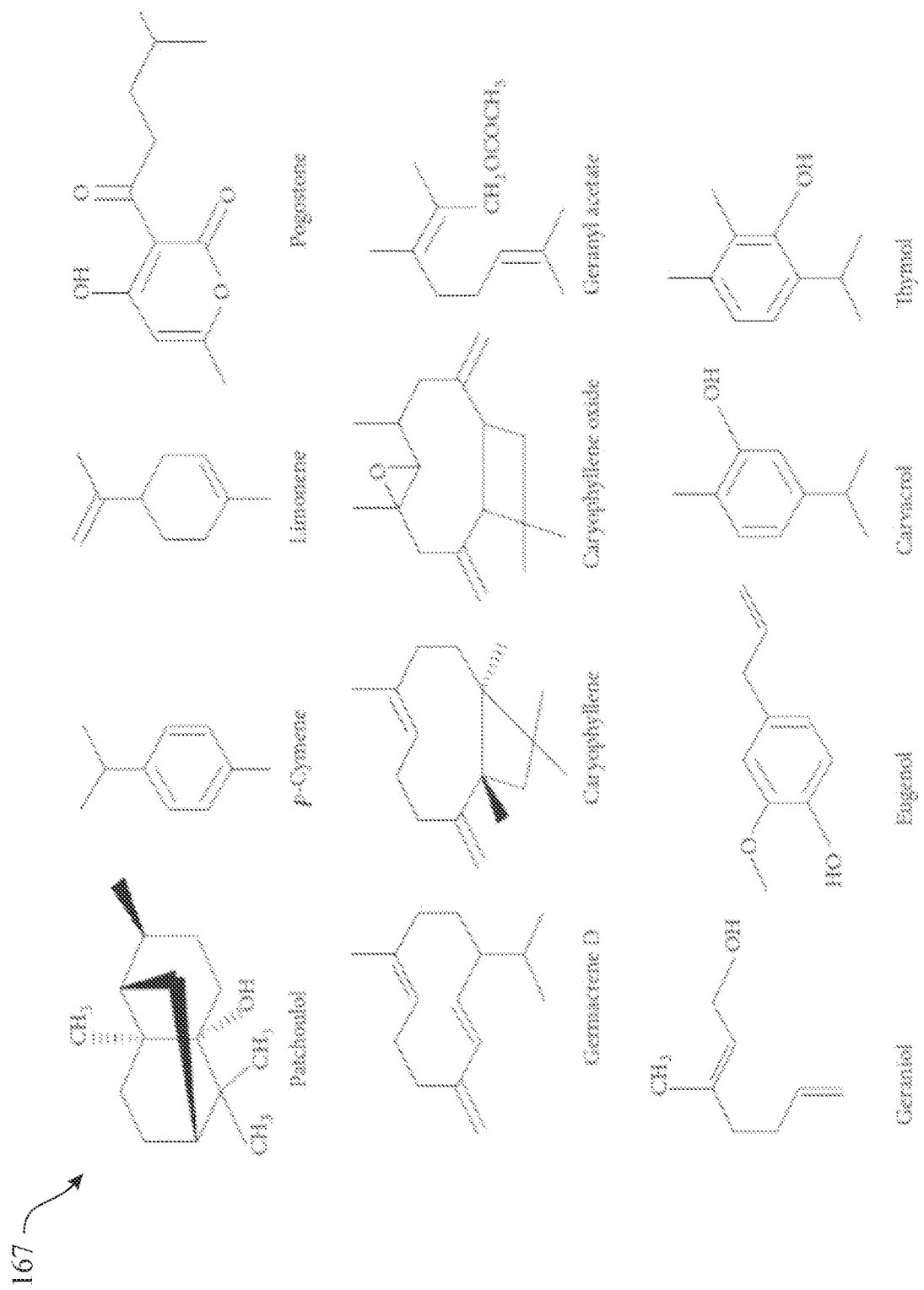
FIG. 10 presents a variety of exemplary chemical arrangements that are all suitable for use as a wound treatment composition with the contactless wound treatment barrier assembly.

A listing of a number of optional wound treatment compositions 167 that can be applied to the wound treatment composition carrier 168 for treatment of a wound of a patient are listed in tables 1, 2 and 3 presented below. A diagrammatic representation of several exemplary wound treatment compositions 167 are illustrated and named accordingly in FIG. 10.

The following is a list of optional wound treatment compositions 167, including:
elemental Iodine,
iodoform,
ethanol,
isopropyl alcohol,
maltol,
3-(phenylamino) butan-2-one (schleiferon A),
3-(phenylimino) butan-2-one (schleiferon B),
acetoin and 2-phenylethylamine,
elemental sulfur,
nonanol,
decanol,
undecanol,
dodecanol,
NO gas releasing compounds such as S-Nitrosoglutathione,
1-hydroxy-2-oxo-3,3-bis(2-aminoethyl) 1-triazene,
1-hydroxy-2-oxo-3,3-bis(3-aminoethyl) 1-triazene,
1-hydroxy-2-oxo-3-(3-aminopropyl) 3-(4-aminobutyl) 1-triazene
Oxygen,
essential antimicrobial oils from oregano,
thyme,
clove,
lavender,
clary sage,
arborvitae,
active oils eucalyptol,
thymol,
menthol,
carvacrol, thymol,
cinnamic aldehyde,
eugenol,
p-cymene,
allicine,
calendula oil,
melaleuca oil,
lemongrass oil, and
the like.

The wound treatment composition carrier 168 can be fabricated having any suitable shape and size. The shape and size of the wound treatment composition carrier 168 would be such to snugly fit within the interior volume or cavity created by the primed wound treatment composition storage and delivery container body 160. For example, the wound treatment composition carrier 168 can be of a circular shape, where the peripheral edge is equal to or slightly greater than the like peripheral edge of the primed wound treatment composition storage and delivery container body interior surface 163. In another example, the wound treatment composition carrier 168 can be of a star shape, where a diameter defined by the distal points of the star shape is equal to or slightly greater than the like peripheral edge of the primed wound treatment composition storage and delivery container body interior surface 163. In another example, the wound treatment composition carrier 168 can be of a rectangular shape, where diagonal corners of the rectangular shape fits snugly within the primed wound treatment composition storage and delivery container body interior surface 163 of the primed wound treatment composition storage and delivery container body 160. The term snugly is defined as where a pliancy of the wound treatment composition carrier 168 compresses the wound treatment composition carrier 168 slightly when the wound treatment composition carrier 168 is inserted into the interior volume or cavity created by the primed wound treatment composition storage and delivery container body interior surface 163 of the primed wound treatment composition storage and delivery container body 160. Other shapes and sizes providing a snug fit can alternatively be considered, such as a hexagonal shape, an octagonal shape, a triangular shape, and the like. The thickness of the wound treatment composition carrier 168 can be equal to or less than a height of the primed wound treatment composition storage and delivery container body 160. The thickness of the wound treatment composition carrier 168 can be slightly larger than the height of the primed wound treatment composition storage and delivery container body 160 in a condition where the wound treatment composition carrier 168 is compressed when the primed wound treatment composition storage and delivery container closure 165 is secured to the primed wound treatment composition storage and delivery container body 160.

Although the primed wound treatment composition storage and delivery container body 160 is illustrated as having a cylindrical shape, it is also recognized that the primed wound treatment composition storage and delivery container body 160 can be of any suitable shape and size. The shape and size of the wound treatment composition carrier 168 would be configured accordingly to snugly fit therein.

In an alternative arrangement, the wound treatment composition carrier 168 is secured directly to the wound treatment barrier body interior surface 113. In this arrangement, the wound treatment composition carrier 168 would be preferably shaped and sized to rest against the wound treatment barrier body interior surface 113. The size and shape of a sidewall of the wound treatment composition carrier 168 can be shaped to optimize an exposed surface area of the wound treatment composition carrier 168. For example, a star shaped wound treatment composition carrier 168 would have a greater surface area than a like sized square or round shaped wound treatment composition carrier 168. The greater the exposed surface area, the greater the emission of the wound treatment composition 167 in a gaseous state.

The wound treatment composition carrier 168 can be fabricated of any suitable material having properties capable of absorbing a composition in a liquid state and emitting the composition in a gaseous state. Examples of suitable material can be a porous material, such as an open cell foam, a polyurethane, a reticulated polyurethane foam, a sponge; an absorbent material, such as a fabric, a carpet, and the like.

The wound treatment composition 167 can be any of the following:
Iodine, as tincture, or as iodine releasing compounds (Iodophores), other antimicrobial compounds, maltol, ethanol, isopropyl alcohol, isopropyl alcohol, maltol, 3-(phenylamino) butan-2-one (schleiferon A), 3-(phenylimino) butan-2-one (schleiferon B), acetoin and 2-phenylethylamine, elemental sulfur, nonanol, decanol, undecanol, dodecanol, NO gas releasing compounds such as the NONOates: S-Nitrosoglutathione, 1-hydroxy-2-oxo-3,3-bis(2-aminoethyl)1-triazene, 1-hydroxy-2-oxo-3,3-bis(3-aminoethyl)1-triazene, 1-hydroxy-2-oxo-3-(3-aminopropyl)3-(4-aminobutyl) 1-triazene Oxygen, essential antimicrobial oils from oregano, thyme, clove, lavender, clary sage, melaleuca calendula and arborvitae, as well as the active oils eucalyptol, thymol, menthol, carvacrol, thymol, cinnamic aldehyde, eugenol, and p-cymene, allicine, calendula oil, melaleuca oil, lemongrass oil, and the like.

Figure 2:
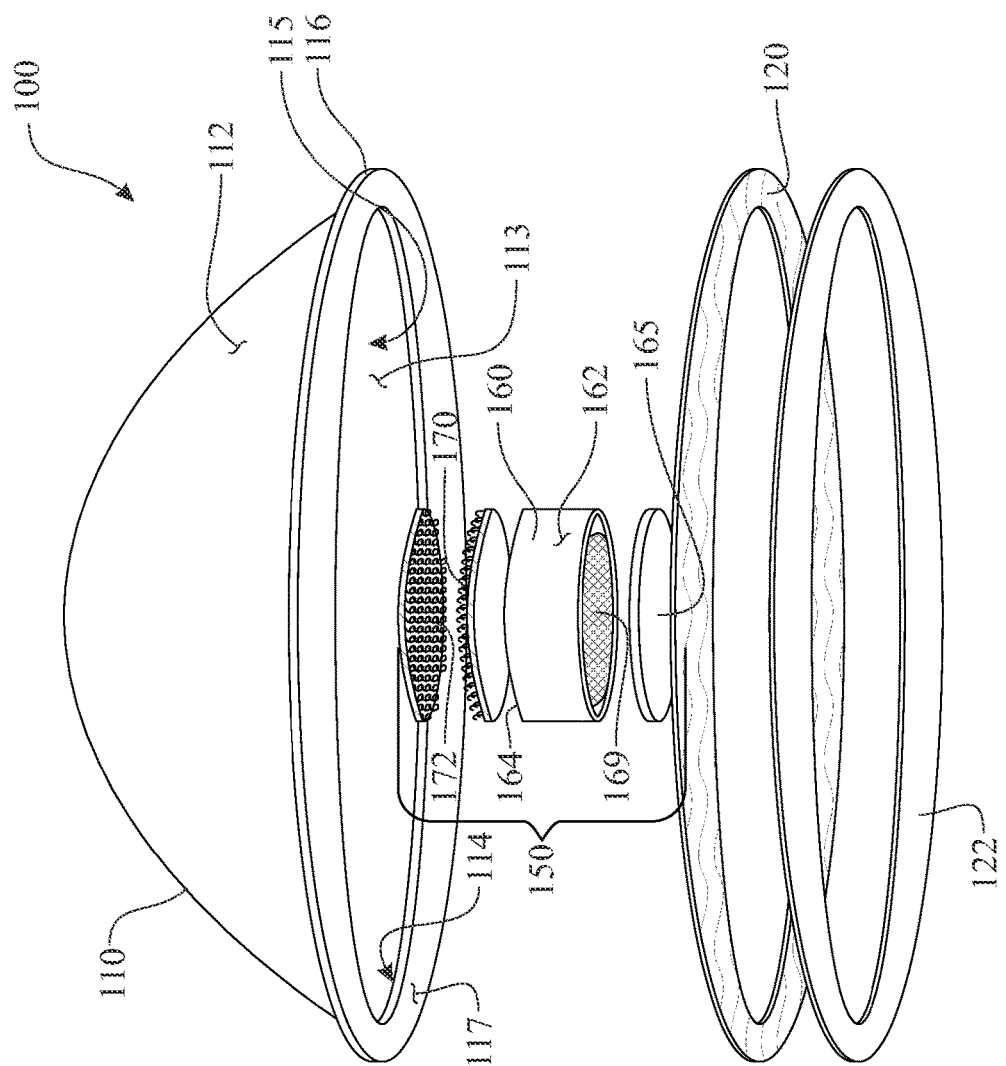
FIG. 2 presents an isometric exploded assembly bottom, front view of the exemplary contactless wound treatment barrier assembly originally introduced in FIG. 1.
Figure 3:
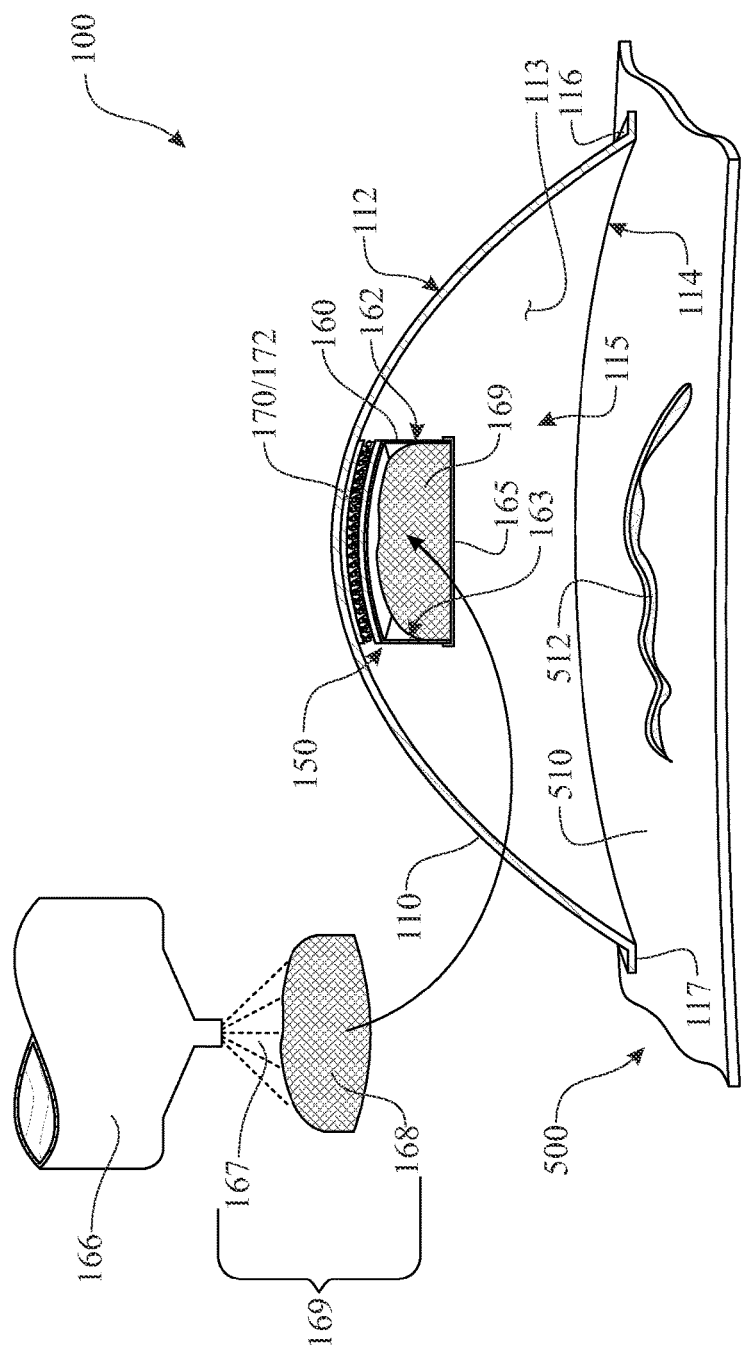
FIG. 3 presents a sectioned front view of the exemplary contactless wound treatment barrier assembly originally introduced in FIG. 1, the exemplary contactless wound treatment barrier assembly shown secured in place over an exemplary wound.

The wound treatment composition 167 can be applied to the wound treatment composition carrier 168 from any wound treatment composition container 166. Instructions or a prescription can be provided, where the instructions or prescription include a volume of wound treatment composition 167 that is to be applied to the wound treatment composition carrier 168. The volume can be based upon the cubic size of the wound treatment composition carrier 168, the treatment of the wound, and the like. In one application, the wound treatment composition container 166 can be a retail bottle, where the end user would dispense the wound treatment composition 167 from the wound treatment composition container 166 onto the wound treatment composition carrier 168. In a second application, the wound treatment composition container 166 can be a large delivery container, where the manufacturer would dispense the wound treatment composition 167 from the wound treatment composition container 166 onto the wound treatment composition carrier 168, then package the primed wound treatment composition carrier 169 within a sealed package for transport and delivery to any of a medical facility, a retailer, a distributor, an end user, and the like. The primed wound treatment composition storage and delivery container assembly 150 is secured to the top or upper area of the wound treatment barrier body interior surface 113 using any suitable attachment interface. This can include an adhesive or other bonding agent, a double sided tape adhesive, a dense hook and loop tape 170, 172 (as illustrated in FIGS. 2 and 3), mechanical fasteners (such as rivets, eyelets, nuts and bolts, a hook and eyelet, a snap stud and mating snap socket (receptacle), a staple or multiple staples, a tie (such as a string, a ribbon, and the like), or any other suitable fastener. In another alternative, the wound treatment barrier body 110 can include a pocket for receiving and retaining the primed wound treatment composition storage and delivery container assembly 150. The pocket would comprise an opening for dispensing of the primed wound treatment composition carrier 169 in aerated or gaseous form. Although the illustrations present the dense hook and loop tape 170, 172 as the exemplary attachment interface, it is recognized that the dense hook and loop tape 170, 172 can be replaced using any of the other suitable attachment interface, such as those described above or any other suitable attachment interface known by those skilled in the art.

In an enhanced packaging, the primed wound treatment composition carrier 169 can be filled with a healing gas, such nitric oxide (NO) or any NO releasing solid or liquid.

The contactless wound treatment barrier assembly 100 can be secured to the exemplary injured region 500 using any suitable attachment mechanism. The exemplary contactless wound treatment barrier assembly 100 presents one exemplary suitable attachment mechanism. The exemplary contactless wound treatment barrier assembly 100 includes a support flange adhesive 120 applied to a wound treatment barrier body support flange contact surface 117 of the wound treatment barrier body support flange 116, as best presented in the illustration shown in FIG. 2. The support flange adhesive 120 is protected by a support flange adhesive protective cover 122 until use.

The wound treatment barrier body 110 and wound treatment barrier body support flange 116 are preferably fabricated as a unitary component. The wound treatment barrier body 110 can be fabricated of any suitable material, including melt blown polypropylene, polyethylene, polyamide, polyurethane, polyester, polycarbonate, silicone. The thickness, shape, and material properties should be such to sufficiently retain a distance or non-contact arrangement between any surface of the contactless wound treatment barrier assembly 100 over the exemplary wound 512 (such as the primed wound treatment composition storage and delivery container assembly 150 and the wound treatment barrier body interior surface 113) and the exemplary wound 512. To create an anaerobic condition, the wound treatment barrier body exterior surface 112 of the wound treatment barrier body 110 can be sealed by applying a coating of flex seal silicone spray.

The contactless wound treatment barrier assembly 100 consists of a chamber-like or dome-like structure 110, that can be placed upon and secured to the exemplary skin 510 around the exemplary wound 512 using an adhesive 120 on the wound treatment barrier body support flange 116 extending radially outward from a contacting edge of the dome or chamber 110, to which a polymeric substrate (natural or man-made, such cellulose or polyurethane foam) carrying an antimicrobial and/or healing promoting solid or liquid, capable of subliming or evaporating, has been attached (or built in) to the interior surface 113 of the wound treatment barrier body 110 or the side of the wound treatment barrier body 110 facing the exemplary wound 512. The dome or chamber 110 can be air permeable to deliver the active agent under an aerobic condition or impermeable to deliver the active agent under an anaerobic condition. The ceiling and/or sidewalls of the device dome or chamber 110 is rigid enough and sufficiently distant from the exemplary wound 512 as not to come in contact with the exemplary wound 512, and to allow enough void space to prevent an accidental pressure over the wound treatment barrier body 110 to make any surface within an interior of the wound treatment barrier body 110 contact the exemplary wound 512. The rigidity can be determined by a thickness, a shape, material properties and the like that are considered when designing the wound treatment barrier body 110.

In an alternative arrangement, the primed wound treatment composition carrier 169 can be directly secured to the wound treatment barrier body interior surface 113 of the wound treatment barrier body 110 using any suitable assembly interface. In this configuration, since the primed wound treatment composition carrier 169 may be "wet", a mechanical fastener is more desirable over an adhesive.

Several examples of the primed wound treatment composition carrier 169 are presented as follows:

Example 1

A small piece of polyuthetane foam 168 of 1 square inch and 0.25 inch in thickness was soaked in a 5% solution of elemental iodine in alcohol (3 mL) 167. The alcohol is allowed to evaporate at room temperature on a flat piece of glass, in the open air. The dry, iodine infused, foam is attached to the inside of a standard size dust face mask using a staple or any other suitable mechanical fastener. Alternatively, the iodine impregnated polyurethane foam 169 is encased in a screw capped or lid covered container 160, and affixed to the wound treatment barrier body interior surface 113 of the wound treatment barrier body 110 with an adhesive (replacing the dense hook segment 170/dense loop segment 172. The screw cap or lid 165 is removed from the primed wound treatment composition storage and delivery container body 160 just prior to use.

Example 2

A small piece of polyurethane foam 168 of 1 square inch and 0.25 inch in thickness is soaked in a 5% solution of elemental iodine in alcohol (3 mL) 167. The alcohol is not allowed to evaporate during the application and preparation process. The solution 167 is applied to the foam 168. The combination forming the primed wound treatment composition carrier 169 is attached directly to the wound treatment barrier body interior surface 113 of the wound treatment barrier body 110 using any suitable mechanical fastener, as described above.

Example 3

A small piece of polyurethane foam 168 of 1 square inch and 0.25 inch in thickness is attached dry to the wound treatment barrier body interior surface 113 of the wound treatment barrier body 110, and then infused with the alcohol solution 167 in situ just before use.

Example 4

Using a screw-cap cylindrical plastic container 160 having a volume of 4 mL; 50 mg of elemental iodine were placed therein and immediately covered with 3.5 mL of liquid silicone. After 24 hours at room temperature and vented to the air, the container 160 is sealed with the screw cap 165. As previously described, the primed wound treatment composition storage and delivery container assembly 150 containing the wound treatment composition 167 as described in this paragraph is attached to the wound treatment barrier body interior surface 113 of the wound treatment barrier body 110 using a bonding agent.

Example 5

A one (1) week-old knee scrape wound (5 cm×2 cm) with no skin present, that have been treated with hydrogen peroxide for cleaning and topical triple antibiotic for healing, that had failed to start healing and was getting infected, was cleaned again with hydrogen peroxide to remove exudate and pus, and covered with the iodine gas chamber (vault) or wound treatment barrier body 110 (fabricated using a dust face mask) and retained in place using elastic bands 320 (FIG. 4) to keep the wound treatment barrier body 110 in place. After twelve hours (12h), the wound 512 had formed a multi-cracked scab and it appears to be healing. Additional two (2) days of wearing the wound treatment barrier body 110, showed a larger, drier, scab and no signs of pain or infection. The contactless wound treatment barrier assembly 100 delivers enough iodine to be noticed by a somewhat strong odor. The threshold to detect iodine in the air by smell is 0.9 parts per million (ppm). This concentration is manifold lower than the direct use of iodine tincture and comparable to PVP-I, 10% solution (2 to 22 ppm of free iodine). Larger or smaller doses can be controlled by adding more active ingredient to the wound treatment composition carrier 168 or by increasing/decreasing the surface area of the wound treatment composition carrier 168.

A small piece of polyurethane foam 168 of 1 square inch and 0.25 inch in thickness was attached dry to the wound treatment barrier body interior surface 113 of the wound treatment barrier body 110, and then infused with the alcohol solution 167 in situ just before use.

Figure 4:
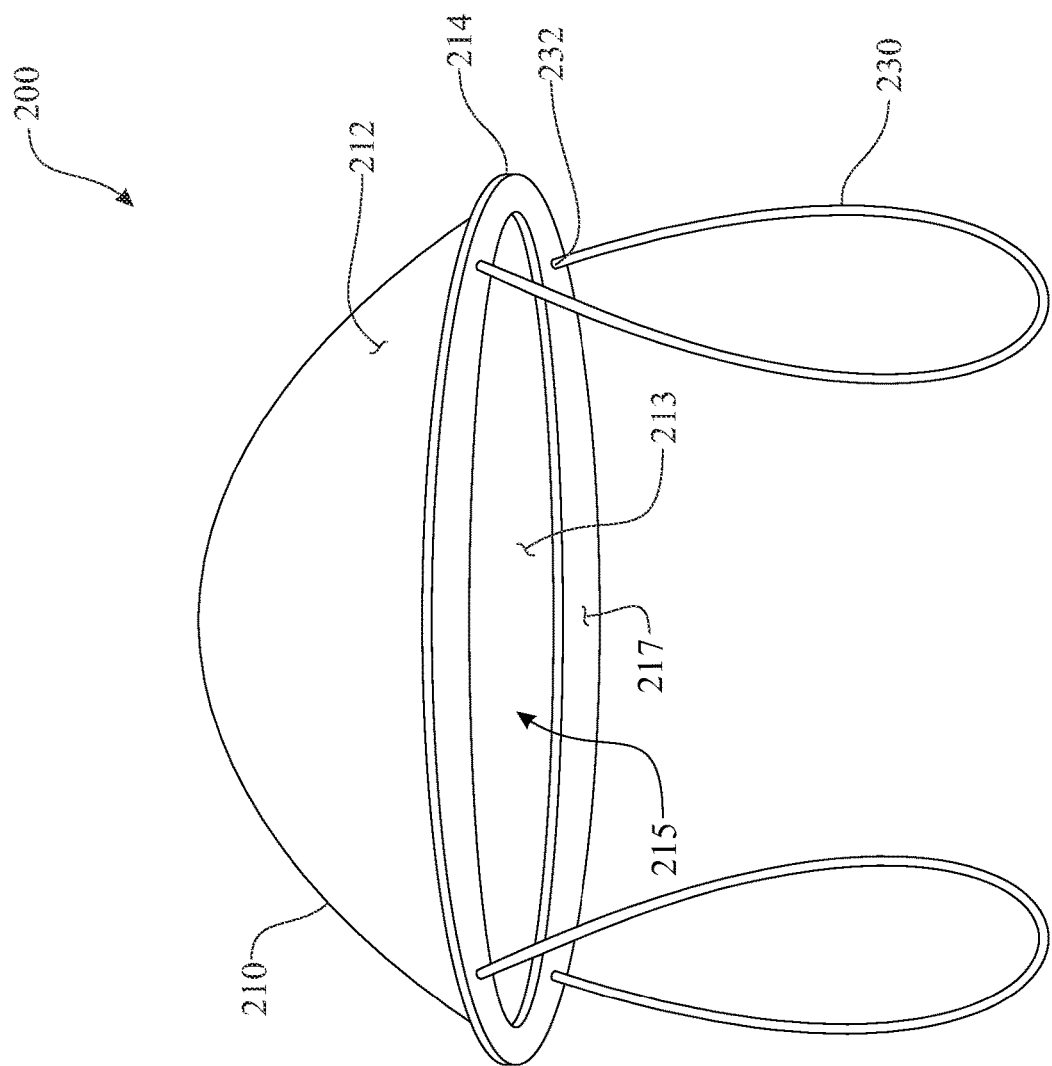
FIG. 4 presents an isometric bottom, front view of a variant of the exemplary contactless wound treatment barrier assembly originally introduced in FIG. 1.

The contactless wound treatment barrier assembly 100 is configured to be applied to the patient using the support flange adhesive 120. It is recognized that the support flange adhesive 120 may not be desirable for all applications. A contactless wound treatment barrier assembly 200, introduced in FIG. 4, illustrates an alternative attachment configuration. The contactless wound treatment barrier assembly 200 and the contactless wound treatment barrier assembly 100 include a number of like components. The contactless wound treatment barrier assembly 200 and the contactless wound treatment barrier assembly 100 would be nearly identical, with the only distinction being the attachment configuration for securing the contactless wound treatment barrier assembly 200 to the patient. Components of the contactless wound treatment barrier assembly 200 not shown in FIG. 4 which are included in the contactless wound treatment barrier assembly 100 are understood to be included in the contactless wound treatment barrier assembly 200 by reference. Like elements of the contactless wound treatment barrier assembly 200 and the contactless wound treatment barrier assembly 100 are numbered the same, wherein the elements of the contactless wound treatment barrier assembly 200 are preceded by the numeral "2".

The contactless wound treatment barrier assembly 100 is configured to be secured to the patient at a location covering the exemplary wound 512 using the support flange adhesive 120. The alternative attachment configuration employs a contactless wound treatment barrier elastic retention member 230 attached to a wound treatment barrier body support flange 214 by an elastic retention member fastener 232. Both ends of the contactless wound treatment barrier elastic retention member 230 can be preassembled to the wound treatment barrier body support flange 214 by an elastic retention member fastener 232 or one end can be secured to the wound treatment barrier body support flange 214, while the second end of the contactless wound treatment barrier elastic retention member 230 can be secured to the wound treatment barrier body support flange 214 after wrapping the contactless wound treatment barrier elastic retention member 230 about the patient.

The contactless wound treatment barrier elastic retention member 230 is only a second exemplary configuration for securing the contactless wound treatment barrier assembly 200 to the patient. It is understood that any suitable attachment configuration can be utilized. This can include tape, a wrap, a wide bandage, or any other suitable attachment configuration known by those skilled in the art. Each of the securing devices would be routed circumscribing the body 110 (or the flange 116) around the limb associated with the wound. The contactless wound treatment barrier assembly 100 can be considered a basic or low tier version. A contactless wound treatment barrier assembly 300, introduced in FIG. 5, introduces a first enhanced variant of the contactless wound treatment barrier assembly 100. The contactless wound treatment barrier assembly 300 and the contactless wound treatment barrier assembly 100 include a number of like components. The contactless wound treatment barrier assembly 300 and the contactless wound treatment barrier assembly 100 would be nearly identical, with the distinction being the enhancement of a vacuum forming element. Like elements of the contactless wound treatment barrier assembly 300 and the contactless wound treatment barrier assembly 100 are numbered the same, wherein the elements of the contactless wound treatment barrier assembly 300 are preceded by the numeral "3".

The contactless wound treatment barrier assembly 300 includes a vacuum creating element 380. The vacuum creating element 380 is a flexible element designed to displace a volume within an interior of a wound treatment barrier body 310. The displacement causes an increase in internal air pressure, causing entrapped air to escape from within an interior (defined by the wound treatment barrier body interior surface 313) of the wound treatment barrier body 310.

In a basic configuration, the air can escape by slightly lifting the wound treatment barrier body support flange 314 from the exemplary skin 510, wherein the wound treatment barrier body interior surface 313 raises under the increased pressure.

Figure 5:
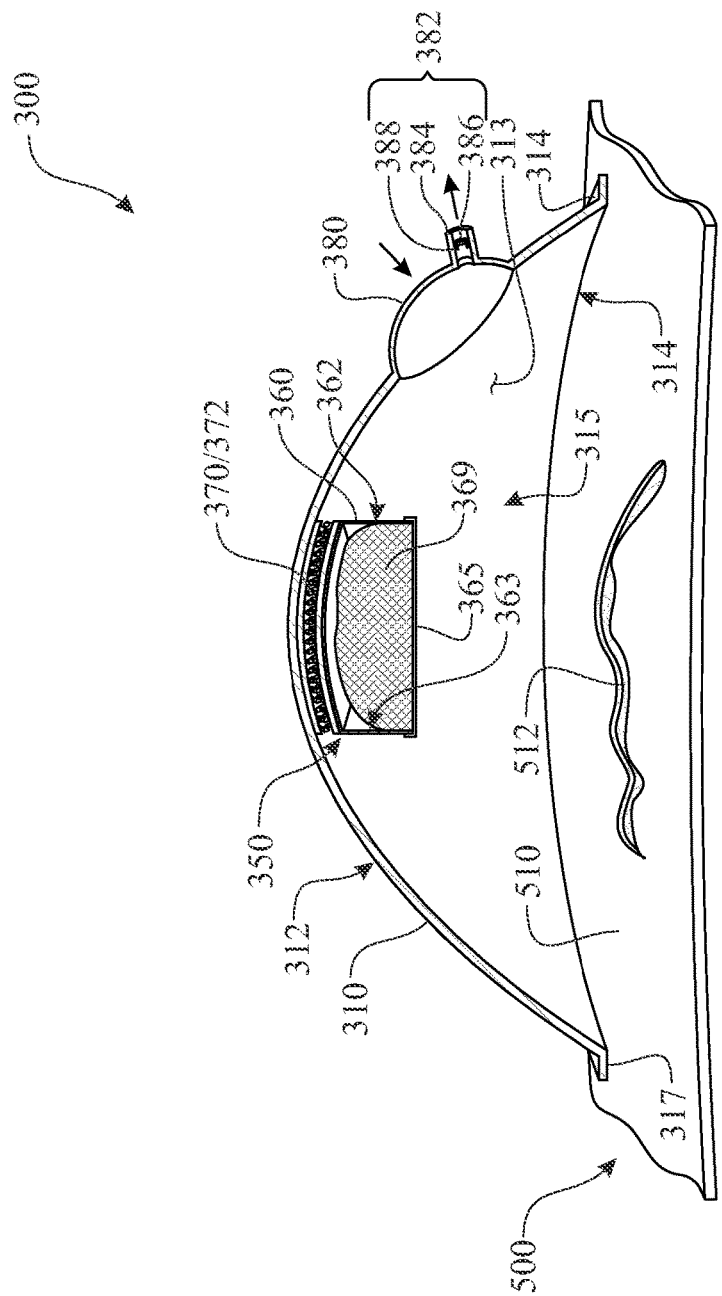
FIG. 5 presents sectioned front view of a first enhanced version of the exemplary contactless wound treatment barrier assembly originally introduced in FIG. 1.

In a more enhanced version, as illustrated in FIG. 5, the contactless wound treatment barrier assembly 300 includes a vacuum retaining check valve 382, where displacement causes entrapped air to vent through the vacuum retaining check valve 382. The vacuum retaining check valve 382 includes a vacuum retaining check valve flow control member 386 hingeably assembled within an interior of a vacuum retaining check valve tubular member 384. The vacuum retaining check valve flow control member 386 would seal against a vacuum retaining check valve flow control member seat 388 in a normal configuration and would be dislodged from the vacuum retaining check valve flow control member seat 388 when air pressure within the interior of the wound treatment barrier body 310 is greater than ambient air pressure external to the wound treatment barrier body 310. When the vacuum retaining check valve flow control member 386 is subjected to a condition where the air pressure within the interior of the wound treatment barrier body 310 is greater than ambient air pressure external to the wound treatment barrier body 310, the vacuum retaining check valve flow control member 386 would dislodge from the vacuum retaining check valve flow control member seat 388, enabling air to pass through the vacuum retaining check valve tubular member 384, this equalizing the air pressure within the interior of the wound treatment barrier body 310 and the ambient air pressure external to the wound treatment barrier body 310. The vacuum retaining check valve 382 can be integrated into the vacuum creating element 380 (as shown), or integrated into the wound treatment barrier body 310 at a separate location. The vacuum enables a better seal between the wound treatment barrier body support flange contact surface 317 and the exemplary skin 510. The vacuum also helps with the disbursement of the wound treatment composition 167 within the interior of the wound treatment barrier body 310.

Figure 6:
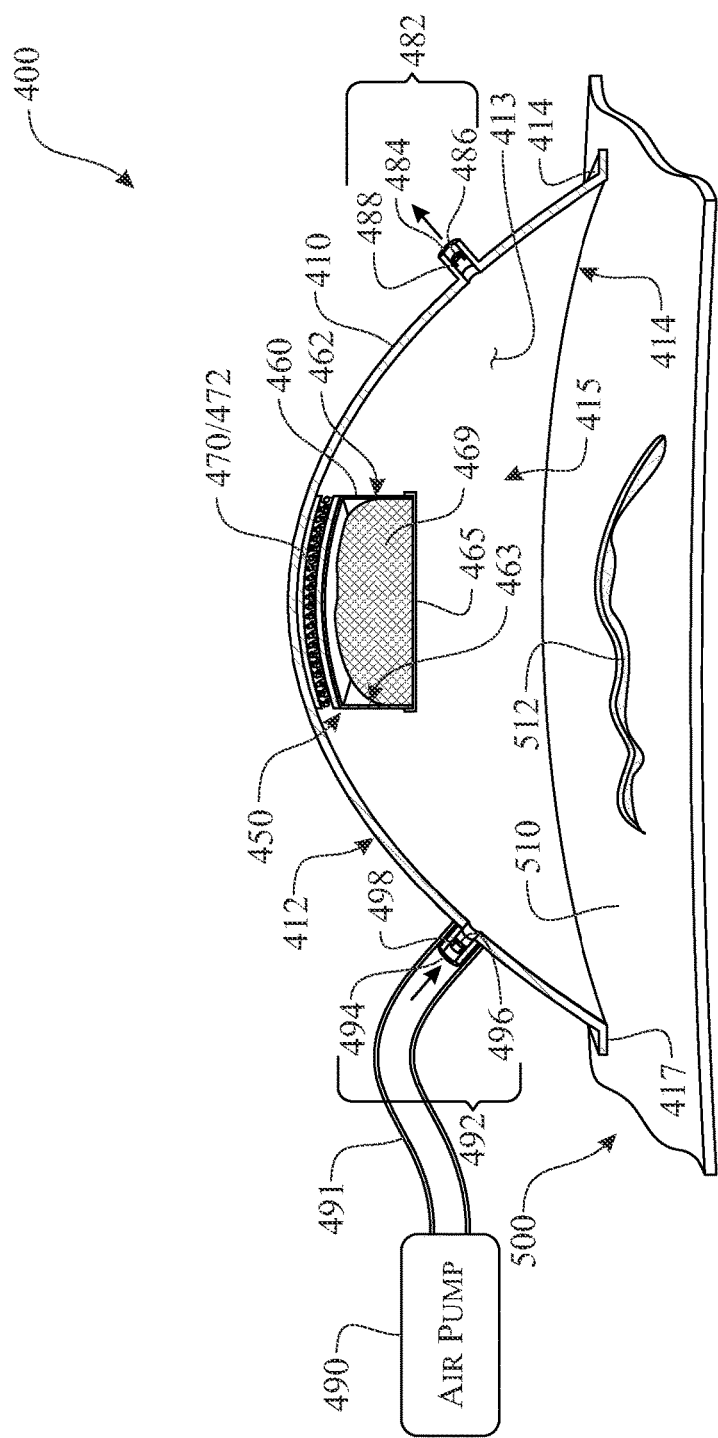
FIG. 6 presents sectioned front view of a second enhanced version of the exemplary contactless wound treatment barrier assembly originally introduced in FIG. 1.

A contactless wound treatment barrier assembly 400, introduced in FIG. 6, introduces a second enhanced variant of the contactless wound treatment barrier assembly 100. The contactless wound treatment barrier assembly 400 and the contactless wound treatment barrier assembly 100 include a number of like components. The contactless wound treatment barrier assembly 400 and the contactless wound treatment barrier assembly 100 would be nearly identical, with the distinction being the enhancement of a gas injection system. Like elements of the contactless wound treatment barrier assembly 400 and the contactless wound treatment barrier assembly 100 are numbered the same, wherein the elements of the contactless wound treatment barrier assembly 400 are preceded by the numeral "4".

The contactless wound treatment barrier assembly 400 includes an air pump 490, which delivers a gas to an interior volume of a wound treatment barrier body 410. The air pump 490 is any suitable gas delivery system to deliver a gas to the interior volume of the wound treatment barrier body 410. The gas can be oxygen, nitrogen, air, or any other desirable gas.

The gas or air is delivered to the interior volume within the wound treatment barrier body 410 by pressure or flow generated from the air pump 490. The gas or air is transferred via an air pump delivery tube 491 to the interior volume within the wound treatment barrier body 410. The air pump delivery tube 491 can be connected to an air fill check valve 492. The air fill check valve 492 includes an air fill check valve flow control member 496 hingeably assembled within an interior of an air fill check valve tubular member 494. The air fill check valve flow control member 496 seals against an air fill check valve flow control member seat 498 formed about a circumference of the interior of the air fill check valve tubular member 494. The air fill check valve 492 would operate in a manner opposite of the vacuum retaining check valve 382, where the pressure differential between the gas or air supplied from the air pump 490 causes the air fill check valve flow control member 496 to flex away from the air fill check valve flow control member seat 498, enabling passage of the gas or air through the air fill check valve 492, into the interior volume of the wound treatment barrier body 410. When gas or air is not being delivered to the interior volume of the wound treatment barrier body 410 from the air pump 490, the air fill check valve flow control member 496 remains seated against the air fill check valve flow control member seat 498, retaining entrapped gas or air within the interior volume of the wound treatment barrier body 410.

The delivered gas or air displaces the existing gas or air within the interior volume of the wound treatment barrier body 410. The displacement causes an increase in internal air pressure, causing entrapped gas or air to escape from within an interior (defined by the wound treatment barrier body interior surface 413) of the wound treatment barrier body 410. In a basic configuration, the air can escape by slightly lifting the wound treatment barrier body support flange 414 from the exemplary skin 510, wherein the wound treatment barrier body interior surface 413 raises under the increased pressure.

In a more enhanced version, as illustrated in FIG. 6, the contactless wound treatment barrier assembly 400 includes an interior pressure venting check valve 482, where displacement causes entrapped air to vent through the interior pressure venting check valve 482. The interior pressure venting check valve 482 includes an interior pressure venting check valve flow control member 486 hingeably assembled within an interior of an interior pressure venting check valve tubular member 484. The interior pressure venting check valve flow control member 486 would seal against an interior pressure venting check valve flow control member seat 488 in a normal configuration and would be dislodged from the interior pressure venting check valve flow control member seat 488 when air pressure within the interior of the wound treatment barrier body 410 is greater than ambient air pressure external to the wound treatment barrier body 410. When the interior pressure venting check valve flow control member 486 is subjected to a condition where the air pressure within the interior of the wound treatment barrier body 410 is greater than ambient air pressure external to the wound treatment barrier body 410, the interior pressure venting check valve flow control member 486 would dislodge from the interior pressure venting check valve flow control member seat 488, enabling air to pass through the interior pressure venting check valve tubular member 484, this equalizing the air pressure within the interior of the wound treatment barrier body 410 and the ambient air pressure external to the wound treatment barrier body 410. The vacuum enables a better seal between the wound treatment barrier body support flange contact surface 317 and the exemplary skin 510. The infusion of a gas or replacement of air within the interior of the wound treatment barrier body 410 aids in a process of healing the exemplary wound 512.

Figure 7:
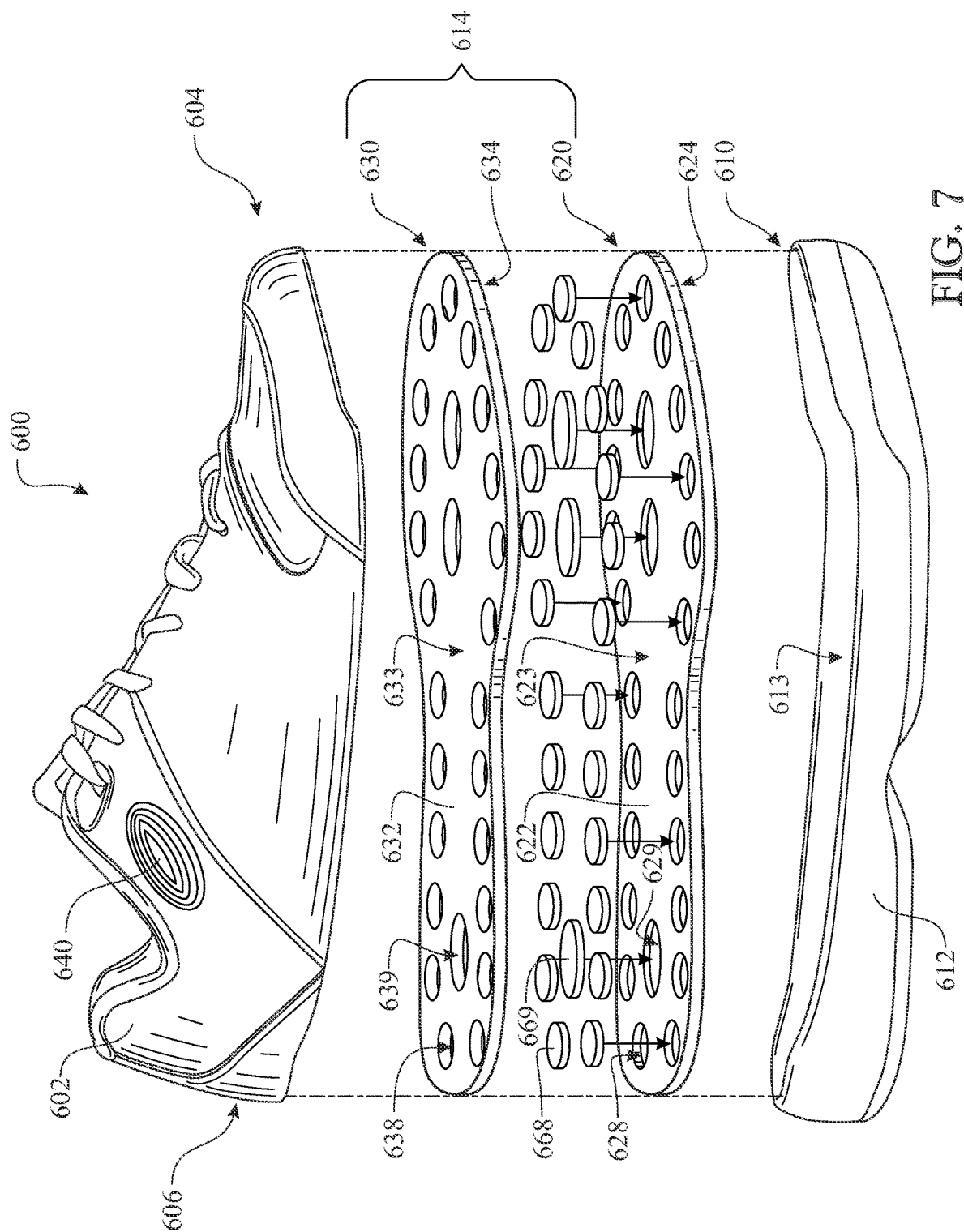
FIG. 7 presents an isometric exploded assembly side view of an alternative exemplary contactless wound treatment barrier assembly applying the same concept and method of use, wherein the alternative exemplary contactless wound treatment barrier assembly is provided as a contactless wound treatment shoe insole for a shoe for treatment of a wound located on a patient's foot.

The general concept of the present invention is to apply a wound treatment composition 167 to a wound in a gaseous form exclusive of any contact to the wound. The same concept can be applied to other applicators. One example of an alternative applicator, a contactless wound treatment shoe assembly 600, is presented in FIG. 7. The contactless wound treatment shoe assembly 600 utilizes a contactless wound treatment shoe insole 614 comprising a laminated assembly including a contactless wound treatment shoe insole base 620 and a contactless wound treatment shoe insole upper 630.

The exemplary contactless wound treatment shoe assembly 600 includes elements common to a shoe, including a contactless wound treatment shoe upper 602, which is assembled to a contactless wound treatment shoe insole seat 613; the contactless wound treatment shoe insole seat 613 being defined partially by an interior surface of a contactless wound treatment shoe outsole 612 of a contactless wound treatment shoe sole 610. Orientation of the contactless wound treatment shoe assembly 600 can be referenced by a contactless wound treatment shoe toe section 604 and a contactless wound treatment shoe heel section 606.

The contactless wound treatment shoe insole base 620 is fabricated by shaping a material into a contactless wound treatment shoe insole base body 622. Orientation of the contactless wound treatment shoe insole base body 622 can be references by an insole base body upper surface 623, considered to be upward facing during use, and an insole base body lower surface 624, considered to be downward facing during use. Similarly, the contactless wound treatment shoe insole upper 630 is fabricated by shaping a material into a contactless wound treatment shoe insole upper body 632. Orientation of the contactless wound treatment shoe insole upper body 632 can be references by an insole base upper body upper surface 633, considered to be upward facing during use, and an insole base upper body lower surface 634, considered to downward facing during use.

The contactless wound treatment shoe insole base 620 and the contactless wound treatment shoe insole upper 630 can be fabricated of the same material, similar materials, or different materials.

The exemplary contactless wound treatment shoe insole 614 is fabricated by laminating the insole base body upper surface 623 of the contactless wound treatment shoe insole base body 622 and the insole base upper body lower surface 634 of the contactless wound treatment shoe insole upper body 632 to one another. It is recognized that other methods of manufacturing and arrangements can be employed to result in a contactless wound treatment shoe insole 614 having similar properties.

The contactless wound treatment shoe insole base 620 can include one or more contactless wound treatment shoe insole base receptacles 628, 629. The contactless wound treatment shoe insole base receptacles 628, 629 are located in various locations of the contactless wound treatment shoe insole base 620. The contactless wound treatment shoe insole base receptacles 628, 629 are preferably provided in locations known to have a higher incident rate of wounds on a person's foot.

The contactless wound treatment shoe insole base receptacles 628, 629 can be similar in size, different in size, or a mixture of various sizes, where some receptacles 628, 629 may be similar in size. The contactless wound treatment shoe insole base receptacles 628, 629 are formed having a size and shape to receive a respectively sized and shaped wound treatment composition insert 668, 669. Each wound treatment composition insert 668, 669 would be fabricated similar to the primed wound treatment composition carrier 169 described above. Each contactless wound treatment shoe insole base receptacle 628, 629 can pass through the 620 or include a bottom wall (not shown). The contactless wound treatment shoe insole base 620 can be fabricated of a flexible material enabling a snug or tight fit between each wound treatment composition insert 668, 669 and the receiving contactless wound treatment shoe insole base receptacle 628, 629. Alternatively, the base material (similar to the wound treatment composition carrier 168 of the primed wound treatment composition carrier 169) can be fabricated of a flexible material enabling a snug or tight fit between each wound treatment composition insert 668, 669 and the receiving contactless wound treatment shoe insole base receptacle 628, 629.

The exemplary contactless wound treatment shoe insole upper 630 includes a series of contactless wound treatment shoe insole upper treatment delivery apertures 638, 639 which are preferably located in vertical registration with the contactless wound treatment shoe insole base receptacles 628, 629 of the contactless wound treatment shoe insole base 620. The contactless wound treatment shoe insole upper 630 is fabricated of a material that would adequately support the patient's foot to maintain a distance between upper surfaces of the wound treatment composition inserts 668, 669 and the adjacent surface of the patient's foot, retaining a contactless treatment.

The contactless wound treatment shoe assembly 600 can additionally include an air flow generator 640. The air flow generator 640 can be configured in any of a variety of functions. In a first function, the air flow generator 640 can create an airflow within the interior of the contactless wound treatment shoe assembly 600, aiding in disbursing the wound treatment composition 167.

In a distribution process where the wound treatment composition inserts 668, 669 are prefilled with the wound treatment composition 167; the wound treatment composition inserts 668, 669 can be stored in a moisture impervious packaging until ready for use. Shortly prior to use, the wound treatment composition inserts 668, 669 would be removed from the moisture impervious packaging.

In use, the medical personnel or the patient would determine which of the contactless wound treatment shoe insole base receptacles 628, 629 are optimal for treatment of a respective wound. Upon determination of the optimal contactless wound treatment shoe insole base receptacles 628, 629, the respectively sized wound treatment composition inserts 668, 669 are located and inserted therein. This can be accomplished when the contactless wound treatment shoe insole 614 is the contactless wound treatment shoe assembly 600 removed from or inserted within the contactless wound treatment shoe assembly 600.

The patient would wear the contactless wound treatment shoe assemblies 600 for treatment, replacing the wound treatment composition inserts 668, 669 as needed, until the wounds are healed, or at a point of treatment where exposure to the wound treatment composition is no longer beneficial. To maintain a proper gait, it is suggested to include a pair of contactless wound treatment shoe insoles 614; one contactless wound treatment shoe insole 614 inserted into each shoe 600.

The series of contactless wound treatment shoe insole upper first treatment delivery apertures 638 and the series of contactless wound treatment shoe insole upper second treatment delivery aperture 639 of the contactless wound treatment shoe assembly 600 can create an airflow process, including a pressurization and a suction within each respective cavity. The pressurization and the suction would aid in drawing a gaseous state of the wound treatment composition 167 from the first wound treatment composition insert 668/second wound treatment composition insert 669 inserted in the respective cavity.

Figure 8:
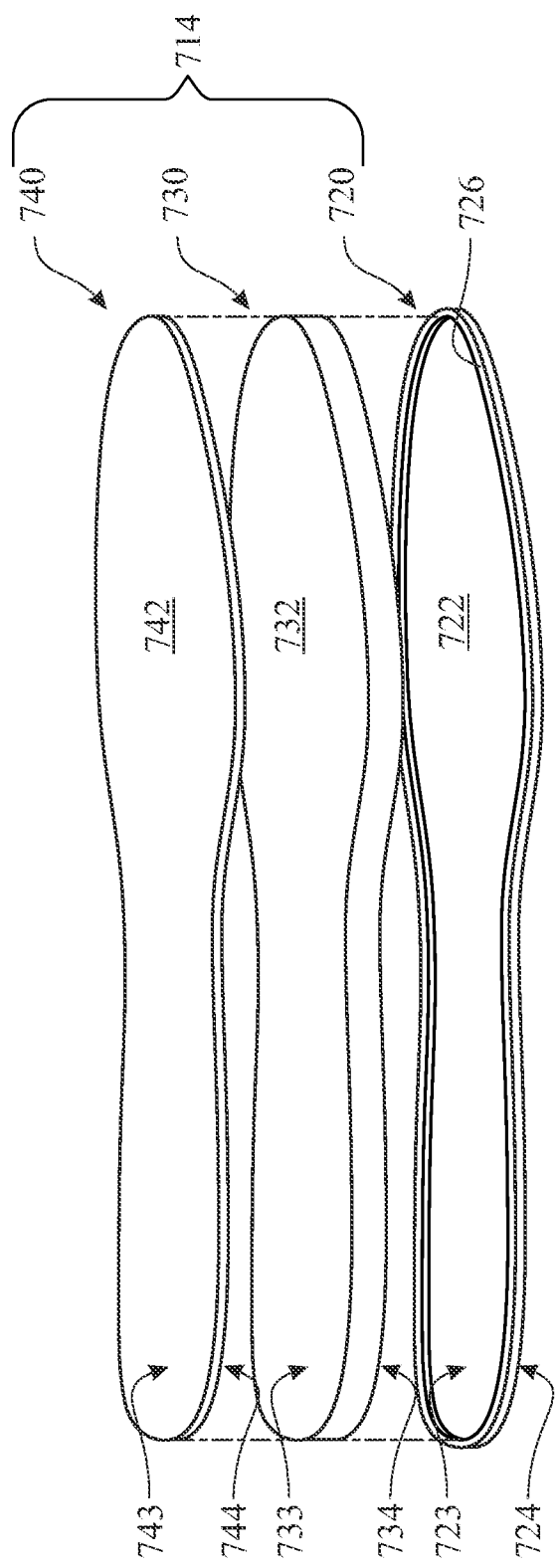
FIG. 8 presents an isometric exploded assembly side view of an alternative wound treatment shoe insole for a shoe.

The contactless wound treatment shoe insole 614 is one exemplary configuration providing contactless wound treatment for a patient's foot. The concept can be provided in any of a number of variations. A contactless wound treatment shoe insole 714, illustrated in FIG. 8, presents a first variant of the contactless wound treatment shoe insole 614. The contactless wound treatment shoe insole 614 includes areas that are contactless to a wound. The contactless wound treatment shoe insole 714 is slightly deviated, where a porous surface exclusive of any wound treatment composition contacts the surface of the foot and the associated wound. The arrangement provides a dispersion system for the wound treatment composition, while maintaining adequate support and comfort to the patient.

The exemplary contactless wound treatment shoe insole 714 includes a contactless wound treatment shoe insole lower 720, a contactless wound treatment shoe insole core 730, and a contactless wound treatment shoe insole upper 740 laminated in sequence. The contactless wound treatment shoe insole lower 720 is fabricated of a moisture impervious material shaped into a contactless wound treatment shoe insole lower body 722, having an insole lower body top surface 723 and an insole lower body bottom surface 724. The contactless wound treatment shoe insole core 730 is fabricated of a porous material shaped into a contactless wound treatment shoe insole core body 732, having an insole core body top surface 733 and an insole core body bottom surface 734. The contactless wound treatment shoe insole core body 732 is fabricated of a material having properties enabling absorption of the wound treatment composition 167, while also enabling gaseous dispersion of the wound treatment composition 167. The contactless wound treatment shoe insole core body 732 would replicate the primed wound treatment composition carrier 169 described above. The contactless wound treatment shoe insole upper 740 is fabricated of a porous material shaped into a contactless wound treatment shoe insole upper body 742, having an insole upper body top surface 743 and an insole upper body bottom surface 744. The contactless wound treatment shoe insole upper body 742 is fabricated of a material and having a thickness and properties enabling support of the patient while maintaining a distance between the patient's foot and the insole core body top surface 733 of the contactless wound treatment shoe insole core 730.

To maintain overflow of a liquid state of the wound treatment composition 167, an insole lower body peripheral edge dam 726 can be formed around a periphery of an edge of the insole lower body top surface 723. The contactless wound treatment shoe insole core body 732 would be seated within the insole lower body peripheral edge dam 726. The insole core body bottom surface 734 and the insole lower body top surface 723 would be laminated to one another. Similarly, the insole upper body bottom surface 744 and the insole core body top surface 733 would be laminated to one another. When the contactless wound treatment shoe insole core body 732 is compressed, the contactless wound treatment shoe insole core body 732 may expulse a small volume of the wound treatment composition 167 in liquid form. Exclusive of the insole lower body peripheral edge dam 726, the expulsed volume of wound treatment composition 167 could puddle at the bottom of the shoe and wet the patient's foot. The insole lower body peripheral edge dam 726 contains any expulsed volume of wound treatment composition 167, thus avoiding any wetting of the patient's foot.

The contactless wound treatment shoe insole 714 can be stored in a moisture impervious packaging until ready for use. Shortly prior to use, the contactless wound treatment shoe insole 714 would be removed from the moisture impervious packaging.

When in use, the patient would preferably be wearing a sock or a loose bandage wrapped around of the treated foot. The at least one of a sock and a bandage aids in providing an additional barrier between the patient's foot and the wound treatment composition 167. During use, the wound treatment composition 167 would convert into a gaseous state and provide treatment of the wound. The gaseous state of the wound treatment composition 167 enables the wound treatment composition 167 to treat the wound without direct constant contact, as opposed to where a wound is normally subjected to direct contact with a liquid, a gel, or a solid composition. Additionally, to prevent future infections, the contactless wound treatment shoe insole 714 can made of any material that would allow the slow release of the wound treatment composition over weeks or even months. Examples of commercially available material that is suitable for this application include PORON®, POLYGEL®, or any other material with similar release properties.

The exemplary contactless wound treatment shoe insole 714 includes three layers 720, 730, 740 laminated together. It is understood that the contactless wound treatment shoe insole 714 can be fabricated of any number of layers, including a single insole body, two insole bodies, three insole bodies (as illustrated), four insole bodies, to nth number of insole bodies.

When the contactless wound treatment shoe insole 714 is fabricated having a single body (such as a 730), the wound treatment composition 167 can be applied to one or both surfaces, such as the exemplary insole body top surface 733, the exemplary insole body bottom surface 734, or both of the exemplary insole body top surface 733 and the exemplary insole body bottom surface 734. By applying the wound treatment composition 167 to the exemplary insole body bottom surface 734, it is less likely that the wound treatment composition 167 wet the patient's foot. Additionally, certain compositions that can be utilized as the wound treatment composition 167 have a tendency to temporarily stain the skin 510 of the patient. Therefore, by applying the wound treatment composition 167 to the exemplary insole body bottom surface 734, it reduces or eliminates a potential of staining the skin 510 of the patient.

The contactless wound treatment shoe insole 614 maintains a contactless relationship between a bottom of a patient's foot and the respective contacting surface (insole base upper body upper surface 633) of the contactless wound treatment shoe insole 614 by inclusion of the series of contactless wound treatment shoe insole upper first treatment delivery apertures 638 and contactless wound treatment shoe insole upper second treatment delivery apertures 639. The contactless wound treatment shoe insole 714 utilizes a modified concept, where the contactless wound treatment shoe insole core body 732 is impregnated with the wound treatment composition 167 or the wound treatment composition 167 is impregnated on a non-contacting surface. The contactless wound treatment shoe insole 714 provides contact between the bottom of a patient's foot and the respective contacting surface (insole upper body top surface 743) of the contactless wound treatment shoe insole 714, while maintaining a distance between the bottom of a patient's foot and the wound treatment composition 167. Therefore, the patient's foot is not subjected to any moisture or direct contact with the wound treatment composition 167.

Figure 9:
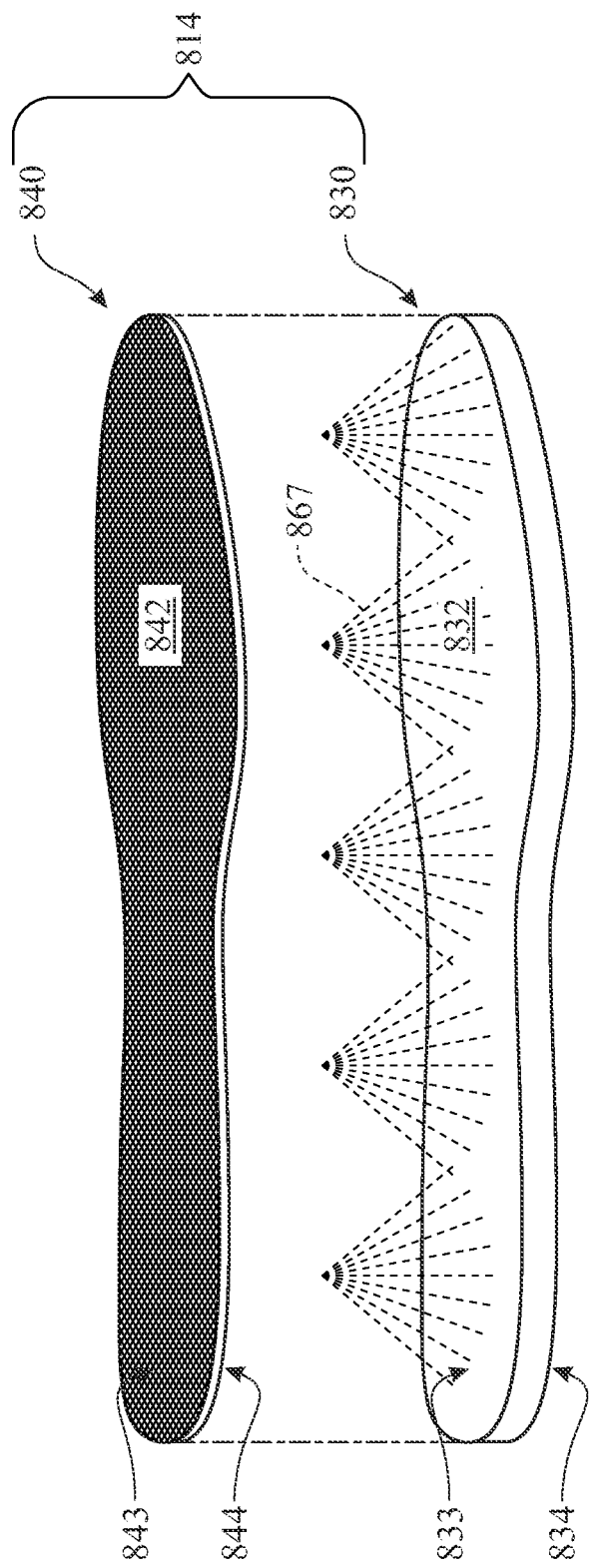
FIG. 9 presents an isometric exploded assembly side view of a modified version of the wound treatment shoe insole for a shoe originally introduced in FIG. 8.

A wound treatment shoe insole 814 is introduced in FIG. 9. The wound treatment shoe insole 814 is a modified version of the contactless wound treatment shoe insole 714, where the wound treatment shoe insole 814 provides contact between the bottom of a patient's foot and the respective contacting surface (insole upper body top surface 843) of the wound treatment shoe insole wound treatment shoe insole 814, while maintaining a distance between the bottom of a patient's foot and the wound treatment composition 167. The wound treatment shoe insole 814 is fabricated having a wound treatment shoe insole upper 840 and a wound treatment shoe insole core 830 laminated to one another. The wound treatment shoe insole core 830 is fabricated of a wound treatment shoe insole core body 832 having an insole core body top surface 833 and an insole core body bottom surface 834. The wound treatment shoe insole core body 832 is preferably fabricated of any material that would allow the slow release of the wound treatment composition over weeks or even months. Examples of commercially available material that is suitable for this application include PORON®, POLYGEL®, or any other material with similar release properties. Similarly, the wound treatment shoe insole upper 840 is fabricated of a wound treatment shoe insole upper body 842 having an insole upper body top surface 843 and an insole upper body bottom surface 844. The insole upper body top surface 843 can be of a nylon material, a velvet material, a velour material, a polyester, a Rayon, a satin material, or any other suitable material. Prior to lamination, a wound treatment composition 867 is applied to an insole core body top surface 833 of a wound treatment shoe insole core body 832 using any suitable application method. The wound treatment composition 867 is allowed to impregnate the wound treatment shoe insole core body 832 and the insole core body top surface 833 to dry. Once the wound treatment shoe insole core body 832 is properly prepared, the wound treatment shoe insole core body 832 and the wound treatment shoe insole upper body 842 are laminated to one another using any suitable laminating bonding medium and or bonding process. The wound treatment shoe insole core body 832 and the wound treatment shoe insole upper body 842 can be of any suitable size and shape during fabrication, such as provided in long continuous sheets of material. The wound treatment shoe insole 814 can be cut to shape following curing of the lamination process.

Figure 11:
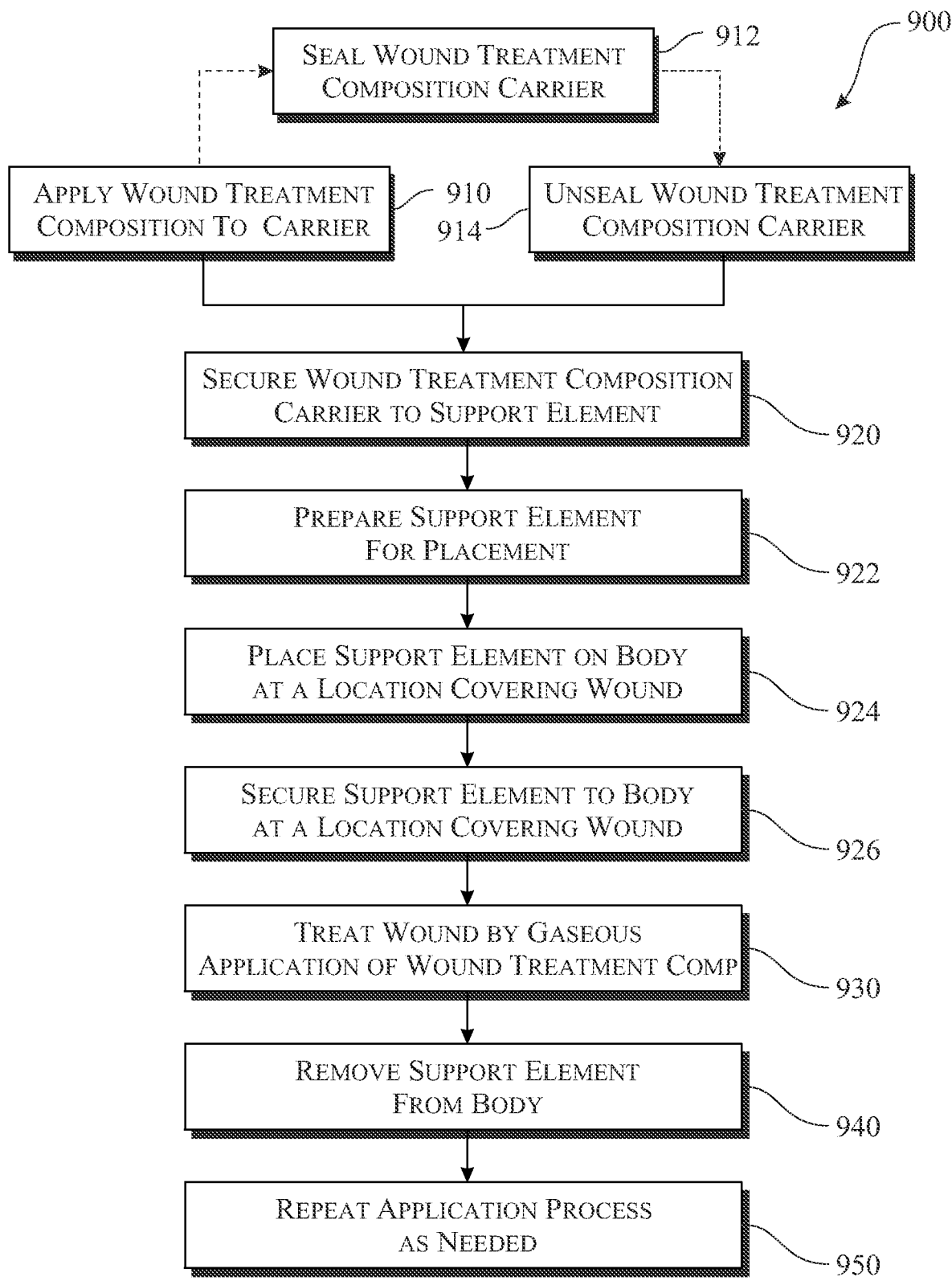
FIG. 11 presents an exemplary contactless wound treatment flow diagram describing a method of using the exemplary contactless wound treatment barrier assembly for applying a wound treatment composition in gaseous form to a wound.

In general, each of the contactless wound treatment barrier assemblies 100, 200, 300, 400, and the contactless wound treatment shoe assembly 600 are configured to be used in a similar manner. The manner of use of described in a contactless wound treatment flow diagram 900 presented in FIG. 11. The contactless wound treatment flow diagram 900 initiates with a step of acquiring the associated components. The primed wound treatment composition carrier 169 is prepared by applying the wound treatment composition 167 to the wound treatment composition carrier 168 in accordance with an apply wound treatment composition to carrier step 910. This can be accomplished following one of two paths. Along a first path, the user would obtain a wound treatment composition carrier 168 in a dry state (prior to being considered as a primed wound treatment composition carrier 169). The user would obtain a volume of a wound treatment composition 167, wherein the wound treatment composition 167 would have a composition based upon the desired treatment. The user would complete the apply wound treatment composition to carrier step 910. The user would prepare the primed wound treatment composition carrier 169 by dispensing a volume of wound treatment composition 167 having the desired composition onto the wound treatment composition carrier 168 and allowing the wound treatment composition 167 to be absorbed into the material of the wound treatment composition carrier 168. Shortly after completion of the apply wound treatment composition to carrier step 910, the user would proceed to a secure wound composition carrier to interior of support element step 920; details of which are presented below.

Along an alternative path, the manufacturer would complete the apply wound treatment composition to carrier step 910. Shortly after completion of the apply wound treatment composition to carrier step 910, the manufacturer would place the primed wound treatment composition carrier 169 within a moisture impervious container in accordance with a seal wound treatment composition carrier step 912. The exemplary illustrations present one configuration for a moisture impervious container, more specifically, a primed wound treatment composition storage and delivery container body 160 sealed using a primed wound treatment composition storage and delivery container closure 165. In the exemplary arrangement, the primed wound treatment composition carrier 169 is sealed within the primed wound treatment composition storage and delivery container body 160 by the primed wound treatment composition storage and delivery container closure 165. The mating edge of the primed wound treatment composition storage and delivery container closure 165 can be sealed using a shrink wrap, a wax, or any other removable moisture impervious seal. The primed wound treatment composition carrier 169 can be sealed in any suitable moisture impervious container, such as the primed wound treatment composition storage and delivery container body 160 detailed above, a plastic bag, a metal container, a plastic container, a foil wrap, a plastic wrap, or any other suitable moisture impervious container. The material and the design of the moisture impervious container would retain the wound treatment composition 167 within the wound treatment composition carrier 168 until a time for use. Following this alternative path, prior to use, the primed wound treatment composition carrier 169 would be removed from the moisture impervious container in accordance with an unseal wound treatment composition carrier step 914 where the removal process would be determined by the packaging. In accordance with the exemplary illustrations, the primed wound treatment composition storage and delivery container closure 165 would be removed from the primed wound treatment composition storage and delivery container body 160, exposing the primed wound treatment composition carrier 169 to the atmosphere within the interior volume of the wound treatment barrier body 110 in accordance with the unseal wound treatment composition carrier step 914.

The primed wound treatment composition carrier 169 is secured to a top region of the wound treatment barrier body interior surface 113 of the wound treatment barrier body 110. In the exemplary illustrations, the primed wound treatment composition carrier 169 is contained within the primed wound treatment composition storage and delivery container body 160. A dense hook segment 170 is secured to a primed wound treatment composition storage and delivery container body attachment surface 164 of the primed wound treatment composition storage and delivery container body 160. A dense loop segment 172 is secured to the wound treatment barrier body interior surface 113 of the wound treatment barrier body 110 in the top region thereof. The primed wound treatment composition storage and delivery container body 160 is secured to the wound treatment barrier body interior surface 113 of the wound treatment barrier body 110 by joining the dense hook segment 170 and the dense loop segment 172 to one another in accordance with a secure wound composition carrier to interior of support element step 920. It is understood that the secure wound composition carrier to interior of support element step 920 can be accomplished in a variety of alternative methods. In a first alternative arrangement, the dense loop segment 172 can be secured to the primed wound treatment composition storage and delivery container body attachment surface 164 and the dense hook segment 170 can be secured to the wound treatment barrier body interior surface 113 of the wound treatment barrier body 110. In another alternative arrangement, the primed wound treatment composition storage and delivery container body attachment surface 164 can be secured to the wound treatment barrier body interior surface 113 of the wound treatment barrier body 110 by an adhesive, such as a bonding agent, a double sided adhesive tape, and the like. In yet another alternative arrangement, the primed wound treatment composition storage and delivery container body attachment surface 164 can be secured to the wound treatment barrier body interior surface 113 of the wound treatment barrier body 110 by a mechanical fastener, such as a snap stud and socket, a hook and loop, a magnetized element and a ferrous or magnetic element, and the like. In one configuration, the primed wound treatment composition storage and delivery container body 160 can be fabricated of a ferrous or magnetic material and a magnetized element can be secured to the wound treatment barrier body interior surface 113 of the wound treatment barrier body 110. In the alternative arrangement, the primed wound treatment composition carrier 169 can be directly secured to the wound treatment barrier body interior surface 113 of the wound treatment barrier body 110 using any suitable attachment configuration, including a mechanical fastener, a bonding agent, and the like. A non-moisture impervious or non-wetting material can be applied to the attachment surface of the wound treatment composition carrier 168 to aid in the securing process.

The contactless wound treatment barrier assembly 100 is prepared for placement and attachment to the patient in accordance with a prepare support element for placement and attachment to the body at a location covering the wound step 922. When using the contactless wound treatment barrier assembly 100, (and similarly, the contactless wound treatment barrier assembly 300, 400), the support flange adhesive protective cover 122 is removed from the contactless wound treatment barrier assembly 100, exposing the support flange adhesive 120. When using the contactless wound treatment barrier assembly 200, the user would prepare the contactless wound treatment barrier elastic retention members 230. In alternative attachment solutions, the user would obtain and prepare the associated materials, such as tape, straps, and the like.

When the contactless wound treatment barrier assembly 100 and any other necessary materials is properly prepared, the contactless wound treatment barrier assembly 100 is placed onto the patient's exemplary skin 510 at a location covering the exemplary wound 512 in accordance with a place support element on the body at the location covering the wound step 924. Once properly positioned, the contactless wound treatment barrier assembly 100 is secured to the patient's exemplary skin 510 at the location covering the exemplary wound 512 in accordance with a secure support element to the body at the location covering the wound step 926.

Once secured, the wound treatment composition 167 is released from the wound treatment composition carrier 168 in a gaseous state within the interior volume of the wound treatment barrier body 110 or any other chamber formed by any wound treatment barrier in accordance with a treat wound by gaseous application of wound treatment composition around the wound step 930.

The healing process is detailed as follows:
Healing Phases:
  Phase 1: Hemostasis, blood clotting occurs here
  Phase 2: Inflammation, hypoxic state (low oxygen and high Nitric Oxide are needed here), activate genes needed for fighting infection
  Phase 3: Proliferation of cells and new skin forming, normoxic state (high pressure oxygen helps healing)
  Phase 4: Remodeling The contactless wound treatment barrier assembly 100 can be removed from the exemplary injured region 500 on a periodic basis, such as daily in accordance with a remove support element from the body after a period of time step 940. If needed, the process is repeated to continue treatment in accordance with a repeat application process as needed step 950.

Treatment of the exemplary wound 512 can be discontinued once the healing process reaches a certain point. The medical professionals can provide guidance to the patient regarding the length of use of the contactless wound treatment barrier assembly 100.

Although the above is directed towards a treatment of a dermatologic wound, it is understood that the same apparatus and method can be adapted for treating sore muscles, fatigue, and the like. The distinction would be the selection of the wound treatment composition 167.

The following are tables comprising chemical compositions of various essential oils for use as alternative medicines. The essential oils can be utilized as the wound treatment composition 167.

Figure 12:
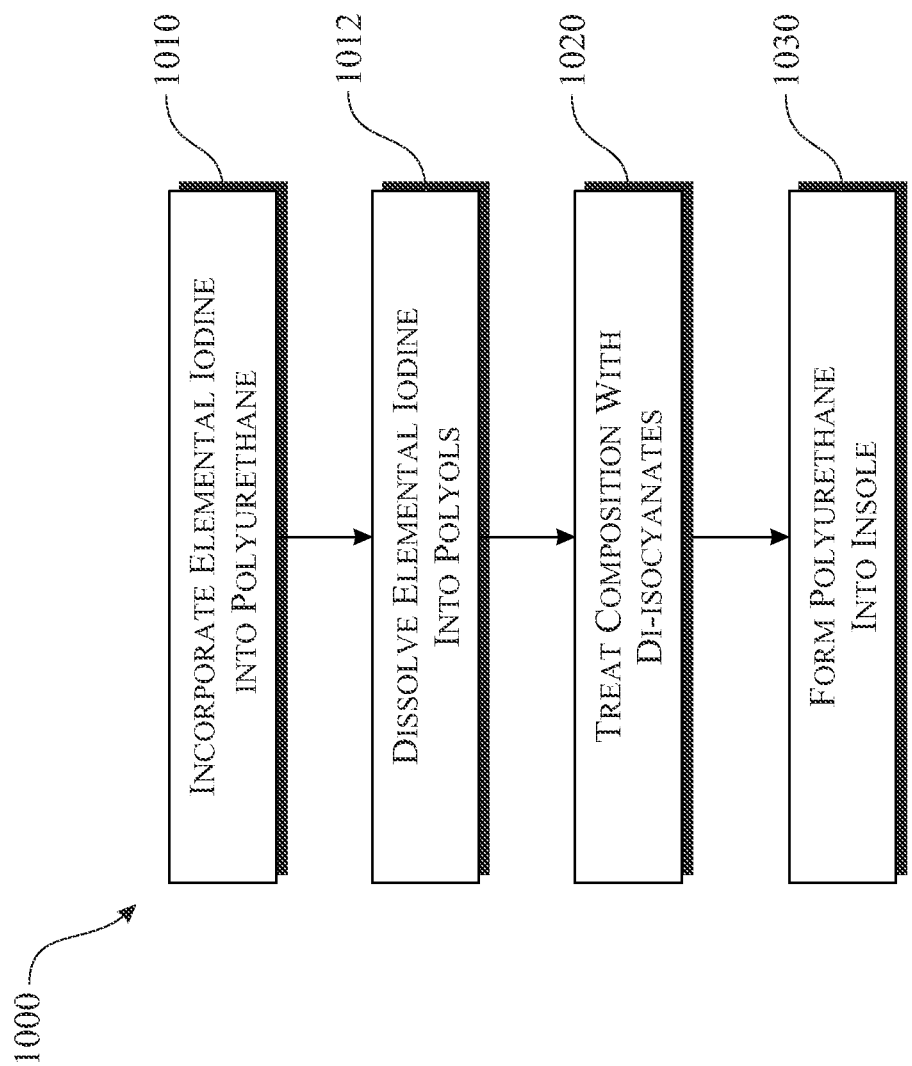
FIG. 12 presents an exemplary flow diagram describing a method of fabricating an insole of a polyurethane, the polyurethane comprising elemental iodine and Di-isocyanates.

An exemplary elemental iodine impregnated insole fabrication process flow diagram 1000 is presented in FIG. 12. The elemental iodine impregnated insole fabrication process flow diagram 1000 initiates by incorporating elemental iodine into a liquid mixture to formulate a volume of polyurethane (step 1010). The two liquid components are mixed together to initiate the polymerization process. The process continues by dissolving elemental iodine into the liquid polyols (step 1012). The process illustrated in the elemental iodine impregnated insole fabrication process flow diagram 1000 continues where the iodine solution in polyols (step 1012) is treated with Di-isocyanates (step 1020). The mixture reacts to form a high volume foam ("Bun") that is cut into sheets. The sheet of the polyurethane composition is cut into an insole using any suitable cutting process, including die cutting, laser cutting, computer controlled cutting or shearing, or any other suitable cutting process. Alternatively, the mixture comprising the iodine solution in polyols and treated with Di-isocyanates (as created in steps 1012 and 1020) can be poured into an insole mold (step 1030), eliminating the cutting step. The latter process makes a denser foam for longer term slow release of iodine gas. In one example, the polyurethane composition can be molded into the shape of the insole. In another example, the polyurethane composition can be rolled into a planar sheet and then cut to the shape of the insole using any suitable shaping process, such as later cutting, computer controlled cutting, sheering with a steel-rule die, and the like. Markings, such as sizing markings, use instructions, manufacturer's markings, materials identification, medical information, and the like, can be applied to the material at any suitable step of the process.

Figure 13:
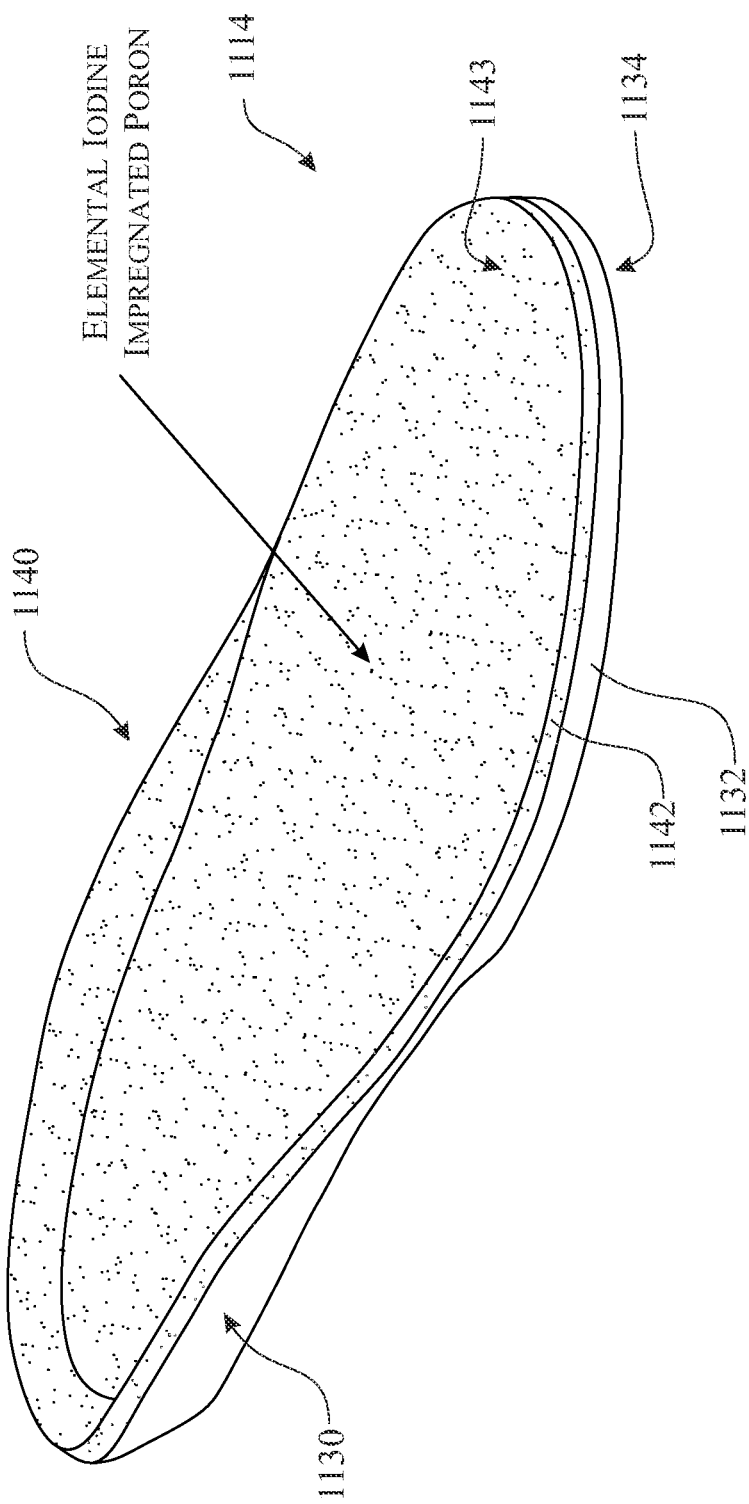
FIG. 13 presents an isometric view of an exemplary insole for a shoe, the insole being fabricated including a laminated microporous polyurethane foam (high density polyurethane open cell material with memory elasticity), wherein iodine is impregnated into the microporous polyurethane foam material of the insole.

An exemplary wound treatment shoe insole 1114 is presented in FIG. 13. The wound treatment shoe insole 1114 comprises a wound treatment shoe insole core 1130 and a wound treatment shoe insole microporous polyurethane foam 1140. One exemplary microporous polyurethane foam is manufactured under a trade name PORON®. The microporous polyurethane foam has a property desirable for the subject process for treating a wound, where the microporous polyurethane foam absorbs and retains moisture while slowly releasing absorbed liquid composition in a gaseous format. The wound treatment shoe insole core 1130 is fabricated having a wound treatment shoe insole core body 1132 shaped to contour to a bottom surface of a patient's foot. The wound treatment shoe insole core body 1132 includes an insole core body bottom surface 1134 and an opposite top surface (an equivalent to the insole core body top surface 733 of the contactless wound treatment shoe insole core 730 illustrated in FIG. 8). The wound treatment shoe insole microporous polyurethane foam 1140 is fabricated of a microporous polyurethane foam material that creates a wound treatment shoe insole Microporous polyurethane foam body 1142, wherein the wound treatment shoe insole microporous polyurethane foam body 1142 is overmolded or laminated upon a wound treatment shoe insole core body 1132. A volume of wound treatment composition 167 is impregnated into the wound treatment shoe insole microporous polyurethane foam body 1142 at any reasonable point in a fabrication process. In one example, the wound treatment composition 167 can be mixed into the microporous polyurethane foam material prior to the overmolding process. In a second example, the wound treatment composition 167 can be mixed into the microporous polyurethane foam material during the overmolding process. In a third example, the wound treatment composition 167 can be applied to the microporous polyurethane foam material after formation of the wound treatment shoe insole 1114. In the third example, the wound treatment composition 167 can be applied to a limited area of the insole microporous polyurethane foam top surface 1143 or the entire surface of the insole microporous polyurethane foam top surface 1143.

One distinction of the wound treatment shoe insole 1114 over the previously described insoles 614, 714, 814 is that the wound treatment shoe insole core body 1132 is shaped to contour to a bottom of the patient's foot. The wound treatment shoe insole microporous polyurethane foam body 1142 would follow the contour of the wound treatment shoe insole core body 1132, as illustrated. It is noted that any of the previously described insoles 614, 714, 814 can include this feature.

Figure 14:
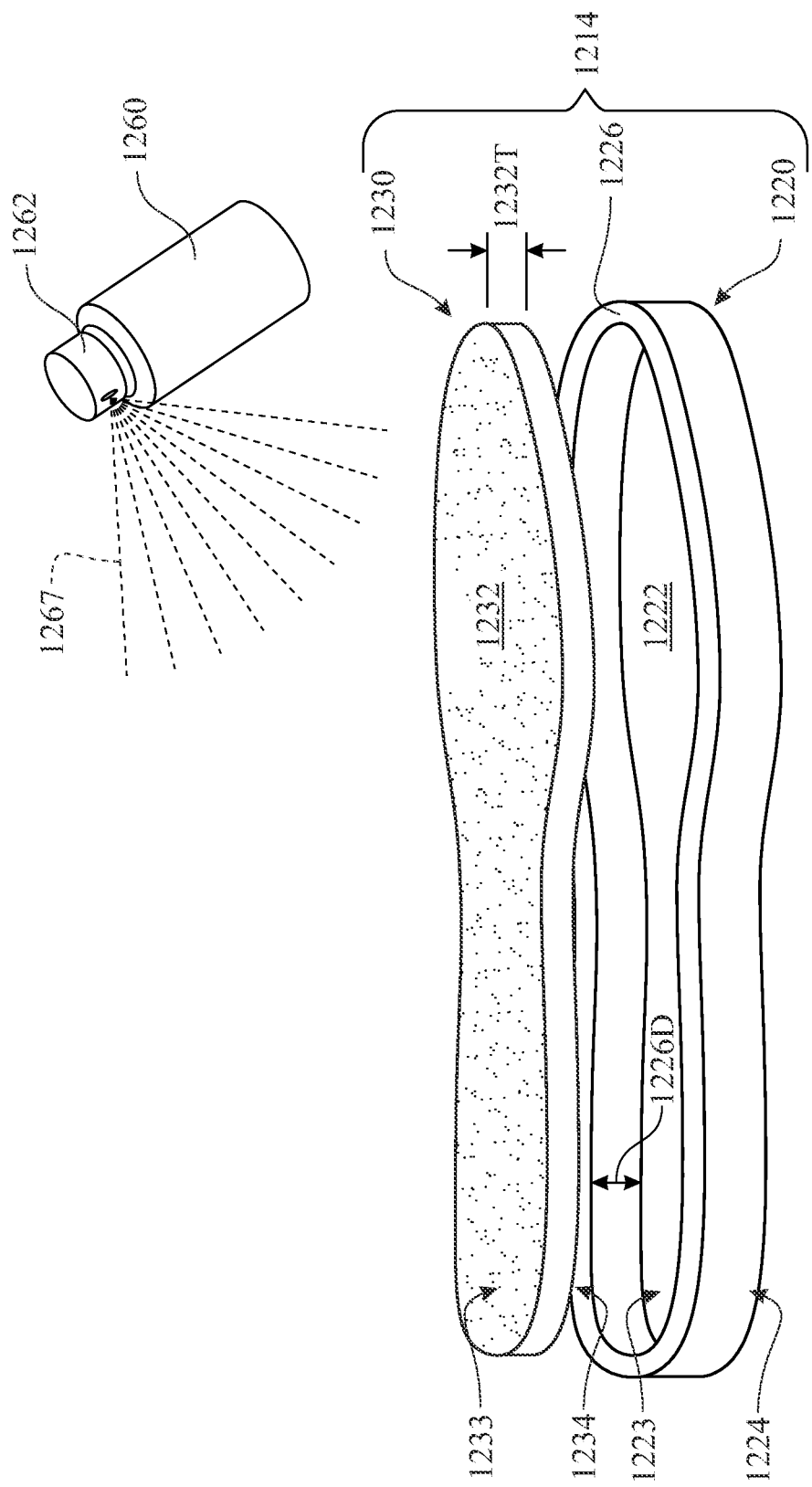
FIG. 14 presents an isometric view of a spray bottle applying or reapplying a wound treatment composition onto a sole of a shoe.

Each of the previously described insoles 614, 714, 814, 1114 were fabricated with the wound treatment composition 167 applied to the insole. An exemplary wound treatment shoe insole 1214 is introduced in FIG. 14. The exemplary wound treatment shoe insole 1214 can use a wound treatment shoe insole core 1230 as a single layer or in conjunction with a contactless wound treatment shoe insole spacing member 1220. The exemplary wound treatment shoe insole core 1230 is fabricated of a wound treatment shoe insole core body 1232 shaped to follow an interior peripheral edge of a shoe; the wound treatment shoe insole core body 1232 having an insole core body top surface 1233 and an insole core body bottom surface 1234.

A wound treatment shoe insole 1214 illustrates an alternative to the previously described insoles. The previously described insoles have a wound treatment composition 167 applied to the manufacturer. Conversely, the wound treatment shoe insole 1214 presents an exemplary insole where a wound treatment composition 1267 can be applied by a manufacturer, a doctor or other medical professional, a pharmacist, the patient, a caretaker, or any other suitable person. In the exemplary illustration presented in FIG. 14, the wound treatment composition 1267 is stored in a wound treatment composition storage and delivery container body 1260. The wound treatment composition storage and delivery container body 1260 includes a dispensing mechanism, such as a wound treatment composition delivery nozzle 1262. The wound treatment composition 1267 would be applied to the insole core body top surface 1233 and/or the insole core body bottom surface 1234 by any of by the manufacturer, the doctor or other medical professional, the pharmacist, the patient, the caretaker, or any other suitable person prior to use by the patient. The patient would obtain the wound treatment shoe insole 1214, apply the wound treatment composition 1267 to the wound treatment shoe insole core body 1232 (if the wound treatment composition 1267 was not previously applied) in accordance with instructions provided by the supplier of the wound treatment composition 1267, the doctor, the medical professional, the pharmacist, or any other authorized party, and insert the wound treatment shoe insole 1214 into a respective shoe. The composition of the wound treatment composition 1267 might require a time delay between application of the wound treatment composition 1267 to the wound treatment shoe insole core body 1232 and use of the wound treatment shoe insole 1214. Once the wound treatment shoe insole 1214 is properly prepared, the user would then place a sock on the respective foot and insert the foot into the shoe. It is understood that the wound treatment shoe insole 1214 can be fabricated having a plurality of layers laminated to one another as previously described. In an alternative application, the dry wound treatment insole 1214 can be inserted into the sock and the foot inserted into the insole containing sock. If the foot wound is too irritating and painful, the wound treatment insole 1214 can be loosely wrapped on a plantar area of the wounded foot with gauze or a bandage.

In another use, the wound treatment shoe insole 1214 can include the contactless wound treatment shoe insole spacing member 1220. The contactless wound treatment shoe insole spacing member 1220 includes an insole spacing member peripheral frame 1226 extending upward from a peripheral edge of a contactless wound treatment shoe insole spacing member base 1222. Orientation of the contactless wound treatment shoe insole spacing member base 1222 can be described as having an insole spacing member base top surface 1223 and an insole spacing member base bottom surface 1224. The insole spacing member peripheral frame 1226 is designed having an insole spacing member peripheral frame depth 1226D that is greater than a wound treatment shoe insole core body thickness 1232T. In use, the wound treatment shoe insole core body 1232 would be inserted into a cavity or an insole spacing member base interior volume 1228 defined by the insole spacing member base top surface 1223 and the insole spacing member peripheral frame 1226. The wound treatment shoe insole core body 1232 can be retained by friction between a peripheral edge of the wound treatment shoe insole core body 1232 against an interior surface of the insole spacing member peripheral frame 1226, by an adhesive placed between the insole spacing member base top surface 1223 and the insole core body bottom surface 1234, by a bonding agent placed between the insole spacing member base top surface 1223 and the insole core body bottom surface 1234, by a double sided adhesive tape placed between the insole spacing member base top surface 1223 and the insole core body bottom surface 1234, by a dense hook and loop tape placed between the insole spacing member base top surface 1223 and the insole core body bottom surface 1234, or by any other suitable retention element.

The insole spacing member peripheral frame 1226 would be of a size and shape to provide a gap between a bottom surface of a patient's foot and the insole core body top surface 1233 of the wound treatment shoe insole core 1230. The insole spacing member peripheral frame depth 1226D would be greater than the wound treatment shoe insole core body thickness 1232T. This provides another arrangement of a contactless wound treatment system. An upper edge of the insole spacing member peripheral frame 1226 would contact the bottom surface of a patient's foot. Since the insole spacing member peripheral frame depth 1226D is greater than the wound treatment shoe insole core body thickness 1232T, the insole spacing member peripheral frame 1226 would maintain a gap between the bottom surface of a patient's foot and the insole core body top surface 1233 of the wound treatment shoe insole core 1230. The combination would preferably be used when the patient is off their feet. This would ensure the insole spacing member peripheral frame 1226 provides sufficient support to maintain a gap between the bottom surface of a patient's foot and the insole core body top surface 1233.

Although the wound treatment shoe insole 1214 is described and shaped for use as an insole, the wound treatment shoe insole 1214 can be sized and shaped for use with any wound and would location. For example, the wound treatment shoe insole 1214 can be circular or oval in shape, creating an apparatus similar to the contactless wound treatment barrier assembly 100 or the contactless wound treatment barrier assembly 200 described above. In this arrangement, the wound treatment shoe insole 1214 can be secured using a wrap or any other suitable retention element.

One primary focus of the present invention is to treat a wound on a patient's foot treatment (after one (1) week 1300a), (after two (2) weeks 1300b), (after three (3) weeks 1300c). It is common for wounds, such as the wounded 1310a, to take many weeks or months to heal, particularly if the patient has underlying medical conditions known to inhibit healing of wounds, such as diabetes, poor blood circulation, or any other medical condition that inhibits healing. Progression of a wound during treatment (after one (1) week 1310a), (after two (2) weeks 1310b), (after three (3) weeks 1310c) healing in conjunction with the exemplary treatment is presented in FIGS. 15 through 17. The wounded foot after one (1) week of treatment 1300a is presented in FIG. 15. The wounded foot after two (2) weeks of treatment 1300b is presented in FIG. 16. The healed foot after three (3) weeks of treatment 1300c is presented in FIG. 17. Progression of the healing process of the wound (after one (1) week 1310a), (after two (2) weeks 1310b), (after three (3) weeks 1310c) is identified by a suffix, where reference characters comprising the suffix "a" refers to the wound after one (1) week of treatment; where reference characters comprising the suffix "b" refers to the wound after two (2) weeks of treatment; and where reference characters comprising the suffix "c" refers to the wound after three (3) weeks of treatment. The exemplary wound 1310a, 1310b, 1310c includes a laceration 1320a, 1320b, 1320c; a deep wound 1322a, 1322b, 1322 c and a shallow wound 1324a, 1324b.

Each of the above are designed to accomplish the same task: treating a patient's wound by providing a wound treatment composition carrier 169, 369, 469, 668, 669, 732, 832, 1232, wherein the wound treatment composition carrier 169, 369, 469, 668, 669, 732, 832, 1232 is carrying a wound treatment composition 167, 867, 1267. The wound treatment composition 167, 867, 1267 is retained in the wound treatment composition carrier 169, 369, 469, 668, 669, 732, 832, 1232 in at least one of a solid state and a liquid state. The wound treatment composition carrier 169, 369, 469, 668, 669, 732, 832, 1232 can be inserted into a cavity or interior volume 115, 315, 415, (628, 638), (629, 639), 1228 created by an environmental barrier 110, 210, 310, 410, 628, 629, 1220. The environmental barrier 110, 210, 310, 410, 628, 629, 1220 can be provided in any suitable shape, including a dome, a cone, a truncated cone, a hemisphere, a cylinder, a cube, a cuboid, a pyramid, a tetrahedron, a square pyramid, a hexagonal pyramid, a truncated pyramid, an outline of an insole, or any other suitable shape. The wound treatment composition carrier 169, 369, 469, 668, 669, 732, 832, 1232 is positioned proximate a patient's wound 512. The patient's wound 512 is treated by exposing the patient's wound 512 to the out-gassed wound treatment composition 167, 867, 1267 over a period of time.

The wound treatment composition 167, 867, 1267 can be any of the above disclosed compositions. Some preferred wound treatment compositions 167, 867, 1267 include an antimicrobial compound, iodine, elemental iodine, and an iodine releasing compound.

The wound treatment composition carrier 732, 832 can be provided as a series of layers. In one arrangement, a top layer 742, 842 can be provided over the wound treatment composition carrier 732, 832, wherein the top layer 742, 842 would be exclusive of any wound treatment composition 167, 867. In a second arrangement, the wound treatment composition can be carried by wound treatment composition carrier inserts 668, 669, where the wound treatment composition carrier inserts 668, 669 would be seated within a first layer 620. A top layer 630 would be provided over a top surface of the first layer 620. Apertures through the top layer 630 define the cavity and spatial arrangement between the patient's wound and the wound treatment composition carrier inserts (carriers) 668, 669. The environmental barrier 110, 210, 310, 410, 628, 629, 1220 can include features to enable drawing the gaseous state of the wound treatment composition 167, 867, 1267 from the wound treatment composition carrier 169, 369, 469, 668, 669, 732, 832, 1232 by introducing at least one of a pressure within the cavity and a vacuum within the cavity. This can be accomplished by applying and removing pressure from the barrier, thus increase and decreasing the pressure within the cavity 115, 315, 415, (628, 638), (629, 639), 1228 defined by the environmental barrier 110, 210, 310, 410, 628, 629, 1220.

Figure 15:
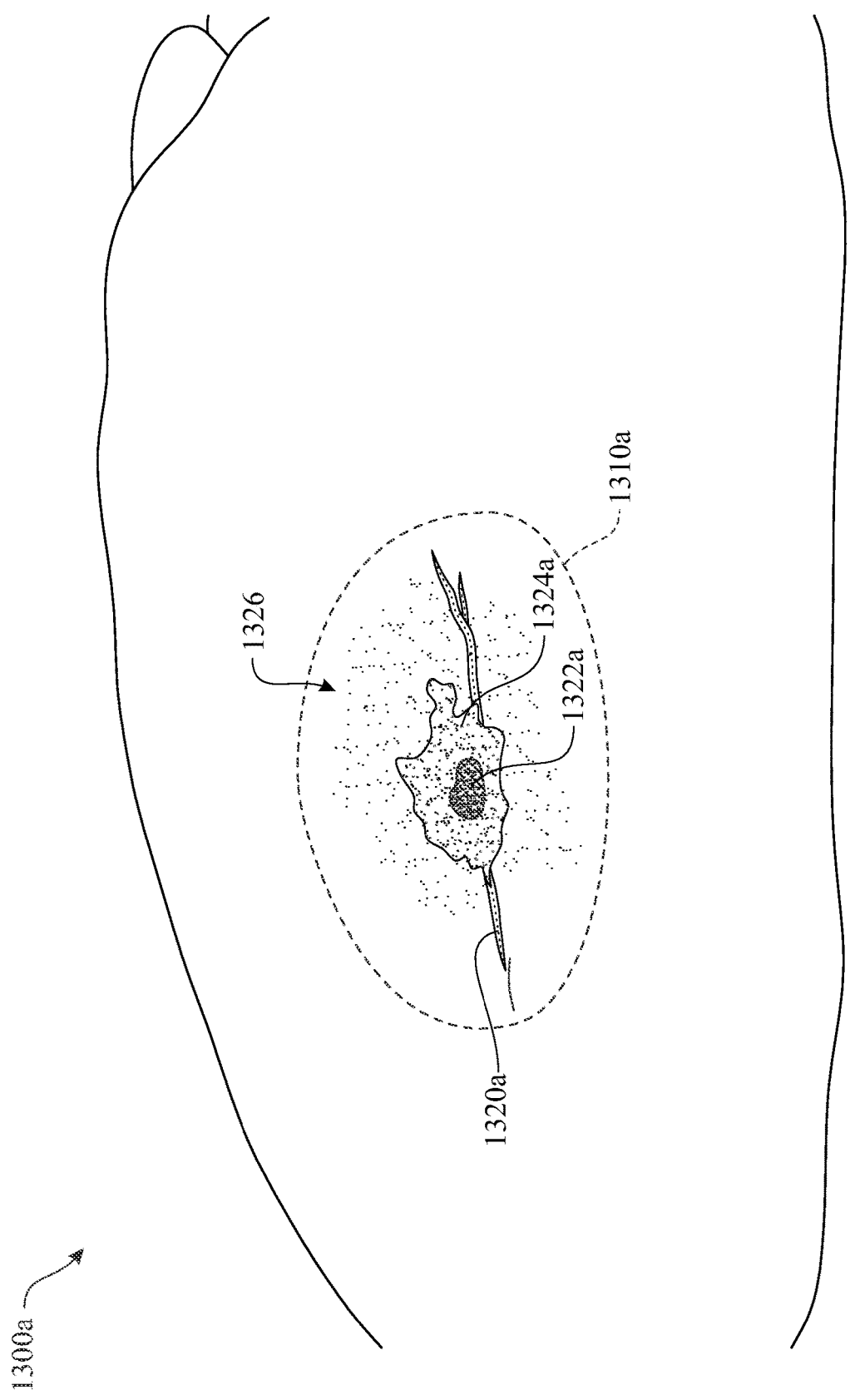
FIG. 15 presents a perspective bottom view of an exemplary wound on a patient's foot, the illustration presenting the wound following one (1) week of treatment.

The wounded foot after one (1) week of treatment 1300a is presented in FIG. 15. After one (1) week, the laceration portion of the wound after one (1) week of treatment 1320a shows the dehiscence (separation) starting to reduce in size. Similarly, the deeper portion of the wound area after one (1) week of treatment 1322a also shows a reduction in the dehiscence (reduces in diameter). Following suit, the shallower portion of wound surrounding the deeper wound after one (1) week of treatment 1324a also shows a reduction in the dehiscence (reduces in diameter). During the first week of treatment, an Iodine stain on stratum corneum surrounding the wound area after one (1) week of treatment 1326 can be formed, leaving a visible stain. The Iodine stain disappears over time, as illustrated in FIGS. 16 and 17.

Figure 16:
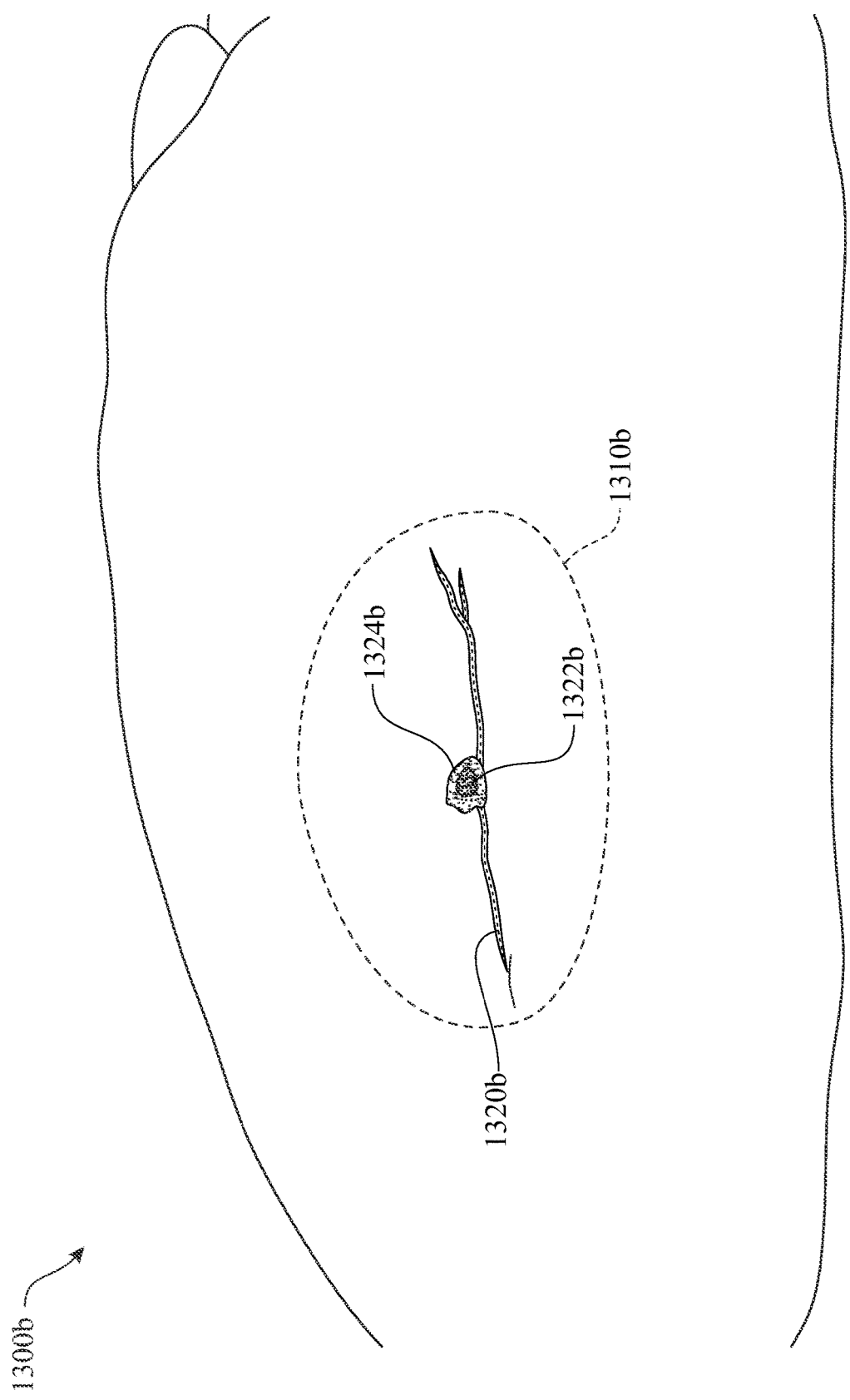
FIG. 16 presents a perspective bottom view of the exemplary wound on a patient's foot originally introduced in FIG. 15, the illustration presenting the wound following two (2) weeks of treatment.

The wounded foot after two (2) weeks of treatment 1300*b* is presented in FIG. 16. After two (2) weeks, the laceration portion of the wound nearly or completely healed after two (2) weeks of treatment 1320*b* shows a continuation in a reduction in the dehiscence (separation). At this point, the laceration portion of the wound nearly or completely healed after two (2) weeks of treatment 1320*b* is considered to be completely healed. Similarly, the deeper portion of the wound after two (2) weeks of treatment 1322*b* also shows a continued reduction in the dehiscence (further reduction in the diameter). A scab (fibrin plug) forms covering the deeper portion of the wound after two (2) weeks of treatment 1322*b*. Following suit, the shallower portion of the wound after two (2) weeks of treatment 1324*b* shows a significant reduction in the dehiscence (significant reduction or more than 80% reduction in the diameter). During the second week of treatment, the Iodine stain on stratum corneum surrounding the wound area after one (1) week of treatment 1326 is significantly reduced or essentially gone.

Figure 17:
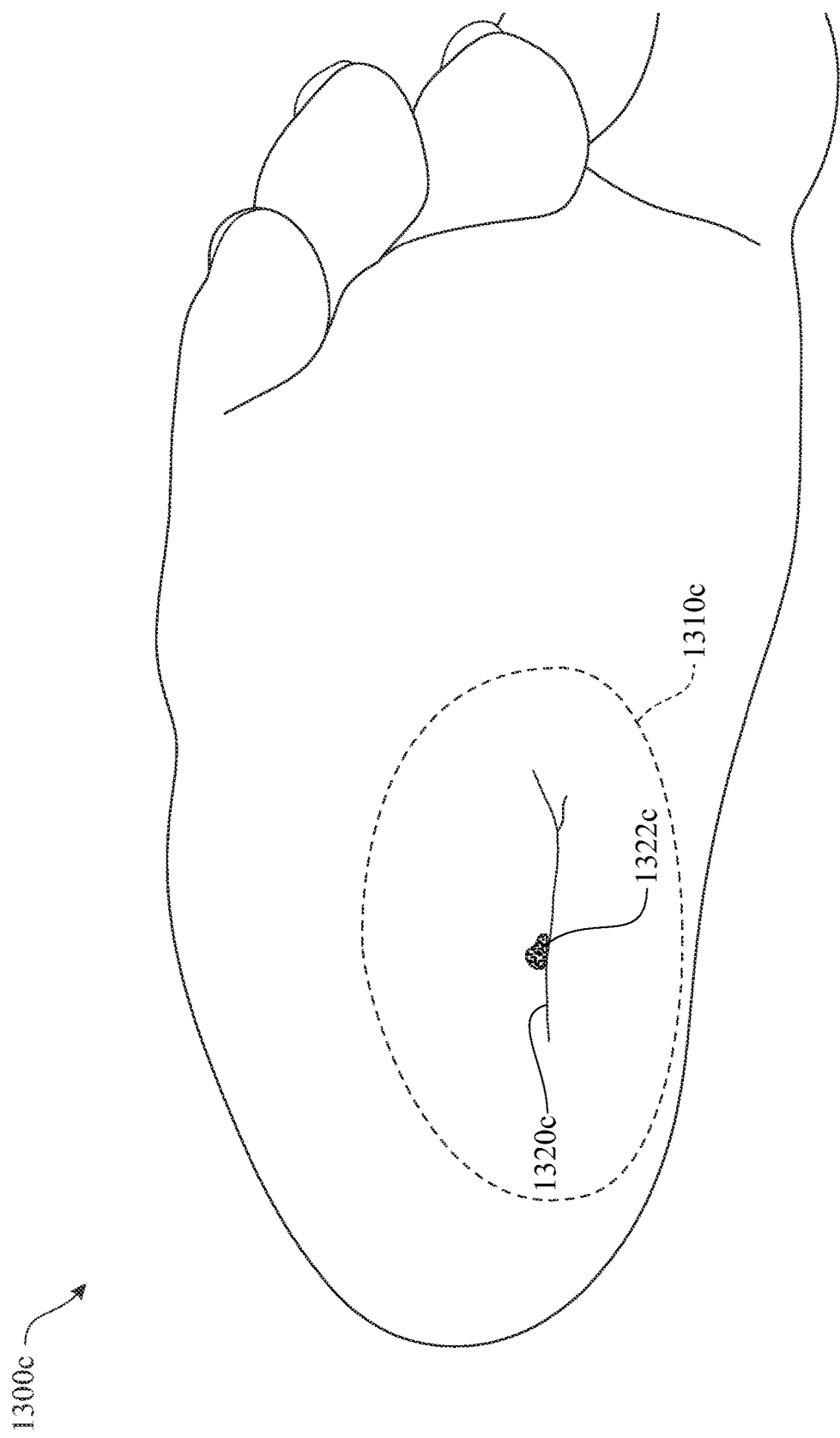
FIG. 17 presents a perspective bottom view of the exemplary wound on a patient's foot originally introduced in FIG. 15, the illustration presenting the wound following three (3) weeks of treatment.

The healed foot after three (3) weeks of treatment 1300*c* is presented in FIG. 17. After three (3) weeks, the keratin has fallen out and the skin is smooth and pink. The wound after three (3) weeks of treatment 1310*c* is essentially healed. The laceration portion of the wound after three (3) weeks of treatment 1320*c* shows a significant reduction in the dehiscence (separation), where the laceration has disappeared by more than 95%. The deeper portion of the wound after three (3) weeks of treatment 1322*c* also shows a significant reduction in the dehiscence (significant reduction in the diameter). The scab covering the deeper portion of the wound after three (3) weeks of treatment 1322*c* is minimal and nearing, beginning to, or already falling off. At this point during the treatment, the shallower portion of the wound after two (2) weeks of treatment 1324*b* has completely healed. During the third (3) week of treatment, the Iodine stain on stratum corneum surrounding the wound area after one (1) week of treatment 1326 has completely disappeared.

Although the exemplary wound treatment carriers are provided in a form of an insole, it can be understood that the same technology can be applied to similar materials and applied in a form of a bandage on other parts of a patient's body.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

ELEMENT DESCRIPTION REFERENCES

Ref No. Description

- 100 contactless wound treatment barrier assembly
- 110 wound treatment barrier body
- 112 wound treatment barrier body exterior surface
- 113 wound treatment barrier body interior surface
- 114 wound treatment barrier body peripheral contact edge
- 115 wound treatment barrier body interior volume
- 116 wound treatment barrier body support flange
- 117 wound treatment barrier body support flange contact surface
- 120 support flange adhesive
- 122 support flange adhesive protective cover
- 150 primed wound treatment composition storage and delivery container assembly (storage and container assembly)
- 160 primed wound treatment composition storage and delivery container body (storage and container body)
- 162 primed wound treatment composition storage and delivery container body exterior surface (storage and container body exterior surface)
- 163 primed wound treatment composition storage and delivery container body interior surface (storage and container body interior surface)
- 164 primed wound treatment composition storage and delivery container body attachment surface (storage and container body end wall or attachment surface)
- 165 primed wound treatment composition storage and delivery container closure (storage and container closure or storage and container cap)
- 166 wound treatment composition container
- 167 wound treatment composition
- 168 wound treatment composition carrier
- 169 primed wound treatment composition carrier
- 170 dense hook segment
- 172 dense loop segment
- 200 contactless wound treatment barrier assembly
- 210 wound treatment barrier body (barrier body)
- 212 wound treatment barrier body exterior surface (barrier body exterior surface)
- 213 wound treatment barrier body interior surface (barrier body interior surface)
- 214 wound treatment barrier body support flange (barrier body support flange or barrier body attachment flange)
- 215 wound treatment barrier body interior volume
- 217 wound treatment barrier body support flange contact surface (barrier body support flange contact surface or barrier body attachment flange contact surface)
- 230 contactless wound treatment barrier elastic retention member (elastic retention member)
- 232 elastic retention member fastener
- 300 contactless wound treatment barrier assembly
- 310 wound treatment barrier body
- 312 wound treatment barrier body exterior surface
- 313 wound treatment barrier body interior surface
- 314 wound treatment barrier body support flange
- 315 wound treatment barrier body interior volume
- 317 wound treatment barrier body support flange contact surface
- 350 primed wound treatment composition storage and delivery container assembly
- 360 primed wound treatment composition storage and delivery container body
- 362 primed wound treatment composition storage and delivery container body exterior surface
- 363 primed wound treatment composition storage and delivery container body interior surface
- 364 primed wound treatment composition storage and delivery container body attachment surface
- 365 primed wound treatment composition storage and delivery container closure
- 369 primed wound treatment composition carrier
- 370 dense hook segment
- 372 dense loop segment
- 380 vacuum creating element
- 382 vacuum retaining check valve 384 vacuum retaining check valve tubular member
386 vacuum retaining check valve flow control member
388 vacuum retaining check valve flow control member seat
400 contactless wound treatment barrier assembly
410 wound treatment barrier body
412 wound treatment barrier body exterior surface
413 wound treatment barrier body interior surface
414 wound treatment barrier body support flange
415 wound treatment barrier body interior volume
417 wound treatment barrier body support flange contact surface
416 support flange adhesive
418 support flange adhesive protective cover
450 primed wound treatment composition storage and delivery container assembly
460 primed wound treatment composition storage and delivery container body
462 primed wound treatment composition storage and delivery container body exterior surface
463 primed wound treatment composition storage and delivery container body interior surface
464 primed wound treatment composition storage and delivery container body attachment surface
465 primed wound treatment composition storage and delivery container closure
469 primed wound treatment composition carrier
470 dense hook segment
472 dense loop segment
482 interior pressure venting check valve
484 interior pressure venting check valve tubular member
486 interior pressure venting check valve flow control member
488 interior pressure venting check valve flow control member seat
490 air pump
491 air pump delivery tube
492 air fill check valve
494 air fill check valve tubular member
496 air fill check valve flow control member
498 air fill check valve flow control member seat
500 exemplary injured region
510 exemplary skin
512 exemplary wound
600 contactless wound treatment shoe assembly
602 contactless wound treatment shoe upper
604 contactless wound treatment shoe toe section
606 contactless wound treatment shoe heel section
610 contactless wound treatment shoe sole
612 contactless wound treatment shoe outsole
613 contactless wound treatment shoe insole seat
614 contactless wound treatment shoe insole
620 contactless wound treatment shoe insole base
622 contactless wound treatment shoe insole base body
623 insole base body upper surface
624 insole base body lower surface
628 contactless wound treatment shoe insole base first receptacle
629 contactless wound treatment shoe insole base second receptacle
630 contactless wound treatment shoe insole upper
632 contactless wound treatment shoe insole upper body
633 insole base upper body upper surface
634 insole base upper body lower surface
638 contactless wound treatment shoe insole upper first treatment delivery aperture
639 contactless wound treatment shoe insole upper second treatment delivery aperture
640 air flow generator
668 first wound treatment composition insert
669 second wound treatment composition insert
714 contactless wound treatment shoe insole
720 contactless wound treatment shoe insole lower
722 contactless wound treatment shoe insole lower body
723 insole lower body top surface
724 insole lower body bottom surface
726 insole lower body peripheral edge dam
730 contactless wound treatment shoe insole core
732 contactless wound treatment shoe insole core body
733 insole core body top surface
734 insole core body bottom surface
740 contactless wound treatment shoe insole upper
742 contactless wound treatment shoe insole upper body
743 insole upper body top surface
744 insole upper body bottom surface
814 wound treatment shoe insole
830 wound treatment shoe insole core
832 wound treatment shoe insole core body
833 insole core body top surface
834 insole core body bottom surface
840 wound treatment shoe insole upper
842 wound treatment shoe insole upper body
843 insole upper body top surface
844 insole upper body bottom surface
867 wound treatment composition
900 contactless wound treatment flow diagram
910 apply wound treatment composition to carrier step
912 seal wound treatment composition carrier step
914 unseal wound treatment composition carrier step
920 secure wound composition carrier to interior of support element step
922 prepare support element for placement and attachment to the body at a location covering the wound step
924 place support element on the body at the location covering the wound step
926 secure support element to the body at the location covering the wound step
930 treat wound by gaseous application of wound treatment composition around the wound step
940 remove support element from the body after a period of time step
950 repeat application process as needed step
1000 elemental iodine impregnated insole fabrication process flow diagram
1010 incorporate elemental iodine into polyurethane
1012 dissolve elemental iodine into Polyols
1020 treat composition with Di-isocyanates
1030 form polyurethane into insole
1114 wound treatment shoe insole
1130 wound treatment shoe insole core
1132 wound treatment shoe insole core body
1134 insole core body bottom surface
1140 wound treatment shoe insole microporous polyurethane foam
1142 wound treatment shoe insole microporous polyurethane foam body
1143 insole microporous polyurethane foam top surface
1214 wound treatment shoe insole
1220 contactless wound treatment shoe insole spacing member
1222 contactless wound treatment shoe insole spacing member base
1223 insole spacing member base top surface 1224 insole spacing member base bottom surface
1226 insole spacing member peripheral frame
1226D insole spacing member peripheral frame depth
1228 insole spacing member base interior volume
1230 wound treatment shoe insole core
1232 wound treatment shoe insole core body
1232T wound treatment shoe insole core body thickness
1233 insole core body top surface
1234 insole core body bottom surface
1260 wound treatment composition storage and delivery container body
1262 wound treatment composition delivery nozzle
1267 wound treatment composition
1300a wounded foot after one (1) week of treatment
1300b wounded foot after two (2) weeks of treatment
1300c healed foot after three (3) weeks of treatment
1310a wound after one (1) week of treatment
1310b wound after two (2) weeks of treatment
1310c healed wound after three (3) weeks of treatment
1320a laceration wound after one (1) week of treatment
1320b laceration nearly or completely healed after two (2) weeks of treatment
1320c laceration after three (3) weeks of treatment
1322a deeper portion of the wound area after one (1) week of treatment
1322b deeper portion of the wound after two (2) weeks of treatment
1322c deeper portion of the wound after three (3) weeks of treatment
1324a shallower portion of wound surrounding the deeper wound after one (1) week of treatment
1324b shallower portion of the wound after two (2) weeks of treatment
1326 Iodine stain on stratum corneum surrounding the wound area after one (1) week of treatment

TABLE 1

Evidence Based Complimentary and Alternative Medicine

| MAPs | Part used | Major chemical compounds | Inhibited microorganisms |
| --- | --- | --- | --- |
| Achillea clavennae | Leaves and flowers | Camphor, myrcene, 1,8-cineole, β-caryophyllene, linalool, geranyl acetate | Klebsiella pneumonia, Streptococcus pneumonia, Haemophilus influenzae, Pseudomonas aeruginosa |
| Achillea fragrantissima | Aerial parts | Yomogi alcohol, 1,8-cineole, artemisia alcohol, thujone | Staphylococcus aureus, Staphylococcus epidermidis, Escherichia coli |
| Achillea ligustica | Aerial parts | Viridiflorol, terpinen-4-ol | Streptococcus mutans |
| Artemisia absinthium | Aerial parts | Myrcene, trans-thujone, trans-sabinyl acetate | E. coli, S. aureus, Staphylococcus epidermidis |
| Artemisia biennis | Aerial parts | (Z)-Beta-ocimene, (E)-beta-farnesene, acetylenes, (Z)- and (E)-En-yn-dicycloethers | E. coli, S. aureus, S. epidermidis |
| Artemisia cana | Aerial parts | Santolina triene, alpha-pinene, camphene | E. coli, S. aureus, S. epidermidis |
| Artemisia dracunculus | Aerial parts | Methylchavicol, methyl eugenol, beta-phellandrene, terpinolene | E. coli, S. aureus, S. epidermidis, Brochothrix thermosphacta, Listeria innocua, L. monocytogenes, Pseudomonas putida, Shewanella putrefaciens |
| Artemisia longifolia | Aerial parts | Alpha-pinene, camphene, 1,8-cineole | E. coli, S. aureus, S. epidermidis |
| Artemisia frigida | Aerial parts | 1,8-Cineole, methylchavicol, camphor | E. coli, S. aureus, S. epidermidis |
| Cinnamomum zeylancium | Bark, leaves | Cinnamaldehyde | Enterobacteriaceae, S. aureus, Streptococcus pyogenes, S. pneumoniae, Enterococcus faecalis, E. faecium, Bacillus cereus, Acinetobacter lwoffii, Enterobacter aerogenes, E. coli, Klebsiella pneumoniae, Proteus mirabilis, P. aeruginosa, Salmonella typhimurium, Clostridium perfringens, Mycobacterium smegmatis |
| Copaifera officinalis | Essential oil | β-Caryophyllene, β-bisabolene, germacrene B, α-copaene, germacrene D, α-humulene, δ-cadinene | S. aureus, E. coli |
| Coriandrum sativum | Leaves | 2E-Decenal, decanal, 2E-decen-1-ol, n-decanol | S. aureus, Bacillus spp., E. coli, Salmonella typhi, K. pneumonia, Proteus mirabilis, P. aeruginosa |
| Cuminum cyminum | Leaves | γ-Terpin-7-al, γ-terpinene, β-pinene, cuminaldehyde | S. typhimurium, E. coli |
| Cymbopogon citratus | Fruit | Ethanolic compounds | Enterobacteriaceae, S. aureus |
| Cymbopogon nardus | Leaves, stems | Δ2-Carene, beta-citronellal | Brochothrix thermosphacta, E. coli, Listeria innocua, L. monocytogenes, P. putida, S. typhimurium, S. putrefaciens |

TABLE 1-continued

Evidence Based Complimentary and Alternative Medicine

| MAPs | Part used | Major chemical compounds | Inhibited microorganisms |
| --- | --- | --- | --- |
| Cyperus longus | Arial part | β-Himachalene, α-humulene, γ-himachalene | S. aureus, L. monocytogenes, L. monocytogenes, E. faecium, S. Enteritidis, E. coli, P. aeruginosa |
| Daucus littoralis | Leaves, stems, roots, flowers, fruits | Germacrene D, acorenone B | S. aureus, E. coli |
| Dracocephalum foetidum | Leaves | n-Mentha-1,8-dien-10-al, limonene, geranial, neral | B. subtilis, S. aureus, M. luteus, E. hirae, S. mutans, E. coli |
| Eremanthus erythropapps | Leaves | (Z)-Caryophyllene, germacrene D, viridiflorol, p-cymene, γ-terpinene | S. epidermidis |
| Eugenia caryophyllata | Flower buds | Phenylpropanoids such as carvacrol, thymol, eugenol, cinnamaldehyde | S. epidermidis |
| Euphrasia rostkoviana | Essential oil | n-Hexadecanoic acid, thymol, myristic acid, linalool | E. faecalis, E. coli, K. pneumoniae, S. aureus, S. epidermidis, P. aeruginosa |
| Foeniculum vulgare | Leaves | Trans-anethole, methylchavicol, limonene | S. typhimurium, E. coli |
| Fortunella margarita | Leaves | Gurjunene, eudesmol, muurolene | B. subtilis, S. aureus, Sarcina luta, S. faecalis, E. coli, K. pneumonia, P. aeruginosa |
| Juniperus phoenicea | Arial part | α-Pinene, β-phellandrene, α-terpinyl acetate | S. aureus, L. monocytogenes, L. monocytogenes, E. faecium, S. Enteritidis, E. coli, P. aeruginosa |
| Laurus nobilis | Arial part | Eucalyptol (1,8-cineole), linalool | Mycobacterium smegmatis, E. coli |
| Lavandula × intermedia 'Provence' (Blue Lavandin) (a cross between L. angustifolia, L. Latifolia) | Arial part | Camphor, eucalyptol (1,8-cineole), linalool, β-pinene, α-pinene | M. smegmatis, E. coli |
| Juniperus excelsa | Leaves and twigs | α-Pinene, α-cedrol, δ-car-3-ene | S. aureus |
| Lippia sidoides | Leaves | Thymol and carvacrol | S. mutans, S. sanguis, S. salivarius, S. mitis |
| Mentha piperita | Arial part | | S. aureus, S. typhimurium, V. parahaemolyticus |
| Mentha pulegium | Arial part | Piperitone, piperitenone, α-terpineol, pulegone | S. aureus, S. epidermidis, B. cereus, L. monocytogenes, E. coli, S. typhimurium, V. cholera, L. monocytogenes, E. faecium, S. Enteritidis |
| Mentha suaveolens | Arial part | Pulegone, piperitone, cis-cis-p-menthenolide, limonene germacrene | Lactococcus lactis subsp. Lactis, S. xylosus |
| Melaleuca alternifolia (tea tree oil) | Essential oil | Terpinen-4-ol, 1,8-cineole, γ-terpinene, α-terpinene, terpinolene | E. coli, S. aureus, S. epidermidis, E. faecalis, P. aeruginosa, M. avium, H. influenzae, S. pyogenes, S. pneumonia |
| Momordica charantia | Seed | Trans-nerolidol, apiole, cis-dihydrocarve, ol germacrene D | E. coli, S. aureus |
| Myrtus communis | Leaves | Eugenol, α-terpineol, γ-terpinene | S. aureus, L. monocytogenes, E. durans, Salmonella Typhi, E. coli, B. subtilis, M. tuberculosis, P. aeruginosa, K. pneumonia, M. avium subsp. paratuberculosis, E. cloacae |
| Nigella sativa | Seeds | Thymoquinone, p-cymene, α-thujene, thymohydroquinone, longifolene | S. aureus, B. cereus, E. coli, P. aeruginosa |
| Ocimum gratissimum | Leaves | Eugenol, methyl eugenol, cis-ocimene, trans-ocimene, α-pinene, camphor | S. aureus, Bacillus spp. E. coli, P. aeruginosa, S. typhi, K. pneumoniae, P. mirabilis, E. cloacae |
| Ocimum kilimandscharicum | Flowers and leaves | Eugenol, borneol, linalool, methyl eugenol | B. subtilis, S. aureus, Citrobacter youngae, E. coli, Klebsiella spp., Micrococcus spp., Proteus spp., Pseudomonas spp., Salmonella spp. |

TABLE 1-continued

Evidence Based Complimentary and Alternative Medicine

| MAPs | Part used | Major chemical compounds | Inhibited microorganisms |
| --- | --- | --- | --- |
| *Origanum vulgare* | Leaves, Arial part | Carvacrol, thymol, γ-terpinene, trans-sabinene hydrate, cis-piperitol, borneol, terpinen-4-ol, linalool | *Clostridium botulinum, C. perfringens, L. monocytogenes, E. coli, S. choleraesuis, S. typhimurium, S. aureus, B. subtilis, Pseudomonas aeruginosa, Shigella sonnei, Sarcina lutea, M. flavus, K. pneumoniae, K. oxytoca* |
| *Ocimum basilicum* | Leaves, stems | γ-Terpinene, methylchavicol | *Brochothrix thermosphacta, E. coli, L. innocua, L. monocytogenes, P. putida, S. typhimurium, S. putrefaciens, M. flavus* |
| *Petroselinum sativum* | Leaves, stems | Myristicin, apiol, 1,2,3,4-tetramethoxy-5-(2-propenyl)-benzene | *B. thermosphacta, E. coli, L. innocua, L. monocytogenes, P. putida, S. typhimurium, S. putrefaciens* |
| *Piper nigrum* | Essential oil | Limonene, δ-3-carene, α-pinene, β-caryophyllene, β-pinene, sabinene, α-felandeno, myrcene, para-cymene, linalool, terpinolene, β-selinene, 1,8 cineole, α-terpinene, α-humulene, α-copaene, eugenol, terpinen-4-ol, camphene, safrole | *S. aureus, E. coli* |
| *Pimpinella anisum* | Seed | Trans-anethole | *S. typhimurium, E. coli* |
| *Plectranthus barbatus* | Leaves | (Z)-Caryophyllene, germacrene D, viridiflorol, p-cymene, γ-terpinene | *S. epidermidis* |
| *P. amboinicus* | Leaves | (Z)-Caryophyllene, germacrene D, viridiflorol, p-cymene, γ-terpinene | *S. epidermidis* |
| *Plectranthus neochilus* | Leaves | α-Pinene, β-pinene, trans-caryophyllene, caryophyllene oxide | *E. faecalis, S. salivarius, S. sobrinus, S. sanguinis, S. mitis, L. casei, S. mutans* |
| *Pogostemon cablin* | Leaves | Patchoulol, δ-guaieno; gurjunene-α, α-guaiene, aromadendrene, β-patchoulene | *K. pneumonia, H. pylori, E. coli, B. subtilis, S. aureus, P. aeruginosa, E. faecalis* |
| *Rosmarinus officinalis* | Leaves, flower | Camphor, camphene, limonene, geraniol, myrcene, linalool benzoylacetate, linalool, α-pinene, α-terpinolene, bornyl acetate, borneol | *E. coli, S. typhimurium, B. cereus, Bacillus subtilis, S. aureus, S. agalactiae, S. epidermidis, S. aureus, P. vulgaris, P. aeruginosa, K. pneumonia, E. faecalis, B. thermosphacta, L. innocua, L. monocytogenes, P. putida, S. typhimurium, S. putrefaciens, M. smegmatis* |
| *Satureja hortensis* | Arial part | Carvacrol, thymol, γ-terpinene | *C. botulinum, C. perfringens,* |
| *Salvia sclarea* | Arial part | Linalool, linalyl acetate, geranyl acetate, β-ocimene acetate, caryophyllene oxide | *S. aureus, S. agalactiae, S. epidermis, E. coli, Proteus vulgaris, P. aeruginosa, K. pneumonia, E. faecalis, B. pumilus, B. subtilis, S. typhimurium* |
| *Salvia officinalis* | Arial part | α-Thujone, camphor, 1,8-cineole, α-pinene | *S. aureus, P. stuartii, P. stuartii, E. coli, Shigella sonnei, Sarcina lutea, M. flavus, B. thermosphacta, E. coli, L. innocua, L. monocytogenes* |
| *Salvia lavandulifolia* | Essential oil | Camphor, α-thujone, beta-thujone, camphene, α-pinene, terpineol | *P. vulgaris, P. aeruginosa, K. pneumonia, E. faecalis* |
| *Satureja cuneifolia* | Aerial parts | Carvacrol and p-cymene | *E. coli, Campylobacter jejuni, S. sonnei, S. aureus, L. monocytogenes, B. cereus, P. aeruginosa, S. enteritidis* |
| *Struchium sparganophora* | Leaves | β-Caryophyllene, germacrene A, α-humulene, germacrene D | *S. typhi, B. cereus, P. mirabilis, P. aeruginosa, B. subtilis* |
| *Syzygium aromaticum* | Leaves, flower bud | Eugenol, eugenylacetate | *P. aeruginosa, Enterobacteriaceae* |
| *Syzygium cumini* | Leaves | α-Pinene, β-pinene, trans- caryophyllene, 1,3,6-octatriene, delta-3-carene, α-caryophyllene, α-limonene | *E. coli, S. aureus, P. aeruginosa, N. gonorrhoeae, B. subtilis, S. aureus* |

TABLE 1-continued

Evidence Based Complimentary and Alternative Medicine

| MAPs | Part used | Major chemical compounds | Inhibited microorganisms |
| --- | --- | --- | --- |
| Trachyspermum ammi | Seeds | — | K. pneumoniae, E. coli, S. aureus |
| Thymus vulgaris | Arial part | Thymol, linalool, carvacrol, 1,8-cineole, eugenol, camphor, camphene, α-pinene, borneol, β-pinene | L. monocytogenes, E. coli, S. typhimurium, S. aureus, C. botulinum, C. perfringens, S. sonnei, S. lutea, M. flavus, B. thermosphacta, L. innocua, L. monocytogenes, P. putida, S. putrefaciens |
| Thymus zygis | Essential oil | — | S. choleraesuis, S. typhimurium, E. coli |
| Thymus mastichina | Leaves, stems | m-Thymol, carvacrol, trans-caryophyllene | B. thermosphacta, E. coli, L. innocua, L. monocytogenes, P. putida, S. typhimurium, S. putrefaciens |
| Thymus kotschyanus | Arial part | Carvacrol, 1,8 cineole, thymol, borneol, E-caryophyllene | S. aureus, S. epidermidis, B. cereus, E. coli |
| Thuja sp. (Thuja plicata, Thuja occidentalis) | Essential oil | Alpha-thujone and beta-thujone | P. aeruginosa, K. pneumoniae, S. aureus, E. coli |
| Verbena officinalis | Arial part | Borneol, geranoil | S. aureus, E. coli, S. typhimurium, L. monocytogenes |
| Warionia saharae | Arial part | β-Eudesmol, trans-nerolidol, linalool, 1,8 cineole, camphor, p-cymene, terpinen-4-ol | S. aureus, B. cereus, P. aeruginosa, E. coli |

TABLE 2

Exemplary Plant Based Wound Treatment Compositions

| MAPs | Part used | Major chemical compounds | Inhibited microorganisms |
| --- | --- | --- | --- |
| Aegle marmelos | Leaves | γ-Cadinene, δ-carene, α-pinene | Candida albicans, Aspergillus niger, Fusarium oxysporum |
| Artemisia biennis | Aerial parts | (Z)-β-Ocimene, (E)-beta-farnesene, acetylenes, (Z)- and (E)-en-yn-dicycloethers | Cryptococcus neoformans, Fonsecaea pedrosoi, A. niger |
| Cinnamomum zeylancium | Bark, leaves | Cinnamaldehyde | C. albicans, C. parapsilosis, C. krusei |
| Coriandrum sativum | Leaves | 2E-Decenal, decanal, 2E-decen-1-ol, n-decanol | C. albicans |
| Daucus littoralis | Leaves, stems, roots, flowers, fruits | Germacrene D, acorenone B | C. albicans |
| Dracocephalum foetidum | Leaves | n-Mentha-1,8-dien-10-al, limonene, geranial, neral | C. albicans |
| Eremanthus erythropappus | Leaves | (Z)-Caryophyllene, germacrene D, viridiflorol, p-cymene, γ-terpinene | C. albicans, C. gattii, C. gattii, C. neoformans, S. cerevisiae |
| Euphrasia rostkoviana | Essential oil | n-Hexadecanoic acid, thymol, myristic acid, linalool | C. albicans |
| Feoniculum vulgare | Seed | Trans-anethole, methylchavicol, limonene | Alternaria alternata, F. oxysporum, A. flavus |
| Fortunella margarita | Leaves | Gurjunene, eudesmol, muurolene | A. niger, C. albicans |
| Glechon spathulata | Leaves | β-Caryophyllene, bicyclogermacrene | Trichophyton rubrum, Epidermophyton floccosum |
| Glechon marifolia | Leaves | β-Caryophyllene, bicyclogermacrene | T. rubrum, E. floccosum |
| Lippia sidoides | Leaves | Thymol and carvacrol | C. albicans |
| Melaleuca alternifolia (tea tree oil) | Essential oil | Terpinen-4-ol, 1,8-cineole, γ-terpinene, α-terpinene, terpinolene | Alternaria spp. A. flavus, A. fumigates, A. niger, Blastoschizomyces Capitatus, C. albicans, C. glabrata, C. parapsilosis, C. tropicalis, Cladosporium spp., C. neoformans, Epidermophyton floccosum, Fusarium spp., Malassezia furfur, Microsporum canis, M. sympodialis, M. gypseum, Penicillium spp., Rhodotorula rubra, Saccharomyces cerevisiae, Trichophyton mentagrophytes, T. rubrum, T. tonsurans, Trichosporon spp. |

TABLE 2-continued

Exemplary Plant Based Wound Treatment Compositions

| MAPs | Part used | Major chemical compounds | Inhibited microorganisms |
| --- | --- | --- | --- |
| Mentha pulegium | Arial part | Piperitone, piperitenone, α-terpineol pulegone | A. niger, C. albicans, C. zemplinina, Kloeckera apiculata, Metschnikowia pulcherrima, Tetrapisispora phaffii |
| Momordica charantia | Seed | Trans-nerolidol, apiole, cis-dihydrocarveol, germacrene D | C. albicans |
| Myrtus communis | Leaves | Eugenol, α-terpineol, γ-terpinene, α-caryophyllene | C. albicans, A. flavus |
| Nigella sativa | Seeds | Thymoquinone, p-cymene, α-thujene, thymohydroquinone, longifolene | A. flavus, Fusarium moniliforme, F. graminearum, P. viridicatum |
| Ocimum species (Ocimum basilicum, Ocimum gratissimum, O. kilimandscharicum, O. lamiifolium, O. suave) | Leaves, flower | Eugenol, methyl eugenol, cis-ocimene, trans-ocimene, α-pinene camphor | C. albicans, C. tropicalis, C. glabrata, P. notatum, R. stolonifer, M. mucedo, A. ochraceus, A. versicolor, A. niger, A. fumigates, T. viride, P. funiculosum |
| Origanum vulgare | Leaves, arial part | Carvacrol, thymol, γ-terpinene, trans-sabinene hydrate, cis-piperitol, borneol, terpinen-4-ol, linalool | C. albicans, A. niger, M. gypseum, M. canis, A. cajetani, T. violaceum, T. mentagrophytes, E. floccosum, T. rubrum, T. tonsurans, phytopathogens B. cinerea and P. oryzae |
| Pelargonium graveolens | Leaves | Citronellol, citronellyl formate, geraniol | C. tropicalis |
| Plectranthus barbatus and P. amboinicus | Leaves | (Z)-Caryophyllene, germacrene D, viridiflorol, p-cymene, γ-terpinene | C. albicans, C. gattii, C. gattii, C. neoformans, S. cerevisiae. |
| Pogostemon cablin | Leaves | Patchoulol, δ-guaieno; gurjunene-α, α-guaiene, aromadendrene, β-patchoulene | Aspergillus species, C. albicans |
| Rosmarinus officinalis | Leaves | Camphor, camphene, limonene, geraniol, myrcene, linalool benzaylacetate, linalool, α-pinene, α-terpinolene, bornyl acetate, borneol | C. albicans, M. gypseum, M. canis, A. cajetani, T. violaceum, T. mentagrophytes, E. floccosum, T. rubrum, T. tonsurans, phytopathogens B. cinerea, P. oryzae |
| Salvia sclarea | Arial part | Linalool, linalyl acetate, geranyl acetate, β- ocimene acetate, caryophyllene oxide | C. albicans, C. tropicalis, C. krusei, C. glabrata, C. parapsilosis |
| Syzygium aromaticum | Leaves | Eugenol, eugenylacetate | A. fumigatus, C. albicans, Candida spp. |

TABLE 3

Exemplary Essential Oils and Respective Antiviral Activity Against Human Pathogens

| Plant | Part used | Chemical compounds | Inhibited microorganisms |
| --- | --- | --- | --- |
| Achillea fragrantissima | Aerial parts | 2,5,5-Trimethyl-3,6-heptadien-2-ol, eucalyptol, artemisia alcohol, thujone | ORF virus (a parapox virus) |
| Artemisia arborescens | Aerial parts | β-Thujone, linalool, myrcene, carvacrol | Herpes simplex virus type 1 (HSV-1) |
| Fortunella margarita | Leaves | Gurjunene, eudesmol, muurolene | Avian influenza A virus (H5N1), |
| Glechon spathulata | Leaves | β-Caryophyllene, bicyclogermacrene | HSV-1 |
| Glechon marifolia | Leaves | β-Caryophyllene, bicyclogermacrene | HSV-1 |
| Hyptis mutabilis | Leaves | α-Phellandrene, p-cymene, E-caryophyllene | HSV-1 |
| Lepechinia salviifolia | Leaves | Germacrene D | HSV-1 |
| Melissa officinalis | Leaves | Myrcene, linalool, camphor, citronellal, β-caryophyllene, caryophyllene oxide, citral | HSV-2, avian influenza virus (AIV) subtype H9N2 |
| Minthostachys mollis | Leaves | α-Pinene, estragole | HSV-1 |

TABLE 3-continued

Exemplary Essential Oils and Respective Antiviral Activity Against Human Pathogens

| Plant | Part used | Chemical compounds | Inhibited microorganisms |
|---|---|---|---|
| *Ocimum campechianum* | Leaves | Linalool, eugenol | HSV-1 |
| *Pogostemon cablin* | Leaves | Patchoulol, δ-guaieno; gurjunene-α, α-guaiene, aromadendrene, β-patchoulene | Influenza A (H2N2) virus |
| *Trachyspermum ammi* | Leaves | Thymol, α-pinene, p-cymene, limonene | Japanese encephalitis virus (JEV) |

What is claimed is:

1. A method of applying a wound treatment composition, the method comprising steps of:
obtaining a wound treatment composition carrier, wherein the wound treatment composition carrier is carrying the wound treatment composition in at least one of a solid state and a liquid state, wherein the wound treatment composition carrier has a property enabling emitting of the wound treatment composition in a gaseous state;
covering a patient's wound within a barrier body, wherein the wound treatment composition carrier is located within an interior volume defined by an interior surface of the barrier body and positions the wound treatment composition carrier proximate the patient's wound;

emitting the wound treatment composition in the gaseous state within the interior volume of the barrier body using at least one of sublimation and evaporation;

treating the patient's wound by exposing the patient's wound to the wound treatment composition in the gaseous state contained within the barrier body over a period of time while preventing contact between the patient's wound and the at least one of the solid state and the liquid state of the wound treatment composition, wherein the wound treatment composition is at least one of iodine, elemental iodine, and an iodine releasing compound, wherein the at least one of sublimation and evaporation occurs in an ambient temperature environment.

2. The method as recited in claim 1, the method further comprising a step of:

providing the wound treatment composition carrier in a form of at least a portion of an insole, wherein the interior volume is defined by an interior surface of a cavity within the insole.

3. The method as recited in claim 1, the barrier body comprising a contacting surface and the interior volume, wherein the wound treatment composition is arranged to emit the wound treatment composition in the gaseous state within the interior volume, the method further comprising a step of:

positioning the wound treatment composition carrier proximate the patient's wound where the contacting surface of the barrier body provides a gas permeating contactless separation between the patient's wound and the wound treatment composition carrier.

4. The method as recited in claim 1, the wound treatment composition carrier further comprising a first layer and at least one second layer, wherein the wound treatment composition is carried by one or more of the at least one second layer, the method further comprising a step of:

maintaining a gas permeating separation between the patient's wound and the wound treatment composition in at least one of the liquid state and the solid state.

5. The method as recited in claim 1, the method further comprising a step of:

inserting the wound treatment composition carrier within a the interior volume of the barrier body.

6. The method as recited in claim 1, the wound treatment composition carrier being located within the interior volume of the barrier body, the method further comprising a step of:

enhancing a step of drawing the gaseous state of the wound treatment composition from the wound treatment composition carrier by introducing at least one of a pressure within the interior volume of the barrier body and a vacuum within the interior volume of the barrier body.

7. A method of applying a wound treatment composition, the method comprising steps of:

obtaining a wound treatment composition carrier, wherein the wound treatment composition carrier is carrying the wound treatment composition in at least one of a solid state and a liquid state, wherein the wound treatment composition carrier has a property enabling carrying the wound treatment composition in at least one of a liquid and a solid state, converting the at least one of the solid state and the liquid state into a gaseous state using at least one of sublimation and evaporation, and emitting of the wound treatment composition in the gaseous state;

inserting the wound treatment composition carrier within an interior volume defined by an interior surface of a barrier body, wherein the barrier body provides a gap between a facing surface of the wound treatment composition carrier and a patient's wound;

positioning the barrier body over the patient's wound locating the wound treatment composition carrier proximate to the patient's wound while remaining contactless to the patient's wound;

treating the patient's wound by exposing the patient's wound to the wound treatment composition in the gaseous state over a period of time while preventing contact between the patient's wound and the at least one of the solid state and the liquid state of the wound treatment composition, wherein the wound treatment composition is at least one of iodine, elemental iodine, and an iodine releasing compound, wherein the at least one of sublimation and evaporation occurs in an ambient temperature environment.

8. The method as recited in claim 7, the method further comprising a step of:

creating a substantially gaseous seal between the barrier body and skin of the patient surrounding the patient's wound being treated.

9. The method as recited in claim 7, wherein the-at least one of solid state and the liquid state of the wound treatment composition is carried in an arrangement where the at least one of the liquid state and the solid state of the wound treatment composition avoids any direct contact with the patient, the method further comprising steps of:

converting the at least one of the solid state and the liquid state of the wound treatment composition to the gaseous state using at least one of evaporation and sublimation; and emitting the wound treatment composition in the gaseous form.

10. The method as recited in claim 7, the method further comprising a step of:

providing the wound treatment composition carrier in a form of at least a portion of an insole, wherein the interior volume is defined by an interior surface of a cavity within the insole.

11. The method as recited in claim 7, the wound treatment composition carrier provided in the barrier body, the barrier body further comprising a contacting surface and the interior volume, wherein the wound treatment composition is arranged to emit the wound treatment composition in the gaseous state within the interior volume of the barrier body, the method further comprising a step of:

positioning the barrier body proximate the patient's wound where the contacting surface surrounding the interior volume of the barrier body containing the wound treatment composition carrier is located at least partially surrounding the patient's wound.

12. The method as recited in claim 7, the wound treatment composition carrier being incorporated within at least a portion of an insole, the insole comprising a first layer and at least one second layer, wherein the wound treatment composition is carried by one or more of the at least one second layer, the method further comprising a step of:

maintaining a gas pervious separation between the patient's wound and the wound treatment composition in at least one of the liquid state and the solid state.

13. The method as recited in claim 7, the method further comprising a step of:

enhancing a step of drawing the gaseous state of the wound treatment composition from the wound treatment composition carrier by introducing at least one of a pressure within the interior volume and a vacuum within the interior volume.

14. A method of applying a wound treatment composition, the method comprising steps of:

obtaining a wound treatment composition carrier, wherein the wound treatment composition carrier is carrying the wound treatment composition in at least one of a solid state and a liquid state, wherein the wound treatment composition carrier has a property enabling emitting of the wound treatment composition in a gaseous state;

inserting the wound treatment composition carrier within an interior volume defined by an interior surface of a barrier body, the barrier body including a contacting surface extending circumferentially about a perimeter of the interior volume of the barrier body, the barrier body providing an air pervious contactless gap between a facing surface of the wound treatment composition carrier and a patient's wound;

positioning the barrier body over the patient's wound locating the wound treatment composition carrier proximate to the patient's wound while the wound treatment composition carrier remains contactless to the patient's wound;

converting the at least one of the solid state and the liquid state into the gaseous state using at least one of sublimation and evaporation;

treating the patient's wound by exposing the patient's wound to the wound treatment composition in the gaseous state over a period of time while preventing contact between the patient's wound and the at least one of the solid state and the liquid state of the wound treatment composition, wherein the wound treatment composition is at least one of iodine, elemental iodine, and an iodine releasing compound, wherein the at least one of sublimation and evaporation occurs in an ambient temperature environment.

15. The method as recited in claim 14, the method further comprising a step of:

creating a substantially gaseous seal between an edge of the barrier body and skin of the patient surrounding the patient's wound being treated using the wound treatment carrier composition.

16. The method as recited in claim 14, wherein the at least one of solid state and the liquid state of the wound treatment composition is carried in an arrangement where the at least one of the solid state and the liquid state of the wound treatment composition avoids any direct contact with the patient, the method further comprising steps of:

converting the at least one of the solid state and the liquid state of the wound treatment composition to the gaseous state using at least one of evaporation and sublimation; and emitting the wound treatment composition in the gaseous form.

17. The method as recited in claim 14, the method further comprising a step of:

providing the wound treatment composition carrier within one of:

a) an insole, or b) a dome.

18. The method as recited in claim 14, the wound treatment composition carrier provided in the barrier body, the barrier body comprising a contacting surface and the interior volume, wherein the wound treatment composition is arranged to outgas within the interior volume, the method further comprising a step of:

positioning the barrier body proximate the patient's wound where the contacting surface of the wound treatment composition carrier provides a gas permeating contactless separation between the patient's wound and the wound treatment composition carrier.

19. The method as recited in claim 14, the method further comprising a step of:

enhancing a step of drawing the gaseous state of the wound treatment composition from the wound treatment composition carrier by introducing at least one of a pressure within the interior volume and a vacuum within the interior volume.

20. The method as recited in claim 1, the wound treatment composition carrier being located within an environment, wherein the environment provides a substantially enclosed, gas pervious region about the patient's wound, wherein the patient's wound remains contactless to the wound treatment composition carrier.

21. The method as recited in claim 1, further comprising a gas pervious barrier placed between the wound treatment composition carrier and the patient's wound, wherein the gas pervious barrier provides a gas pervious region about the patient's wound, wherein gas pervious barrier ensures the patient's wound remains contactless to the wound treatment composition carrier.

22. The method as recited in claim 1, further comprising storing the wound treatment composition carrier carrying the wound treatment composition within a resealable container;
   opening the resealable container to expose the wound treatment composition to an ambient temperature and environment;
   placing the resealable container so that it is supported by the barrier body and the wound treatment composition carrier is in a location within the interior volume such that the wound treatment composition carrier prevents contact with the patient's wound.

23. The method as recited in claim 1, wherein the barrier body is porous.

* * * * *